United States Patent [19]
Hafle

[11] 3,974,428
[45] Aug. 10, 1976

[54] WIDE RANGE, HIGH ACCURACY, ELECTRONICALLY PROGRAMMED SPEED CONTROL SYSTEM

[75] Inventor: Ralph S. Hafle, Benton, Ark.
[73] Assignee: Baldwin Electronics, Inc., Little Rock, Ark.
[22] Filed: May 15, 1974
[21] Appl. No.: 470,166

[52] U.S. Cl. ............................ 318/314; 318/318
[51] Int. Cl.[2] ........................................ H02P 5/32
[58] Field of Search ............ 318/313, 314, 318, 610

[56] References Cited
UNITED STATES PATENTS

| | | | |
|---|---|---|---|
| 2,946,943 | 7/1960 | Nye et al. | 318/610 X |
| 3,110,853 | 11/1963 | Jones | 318/314 X |
| 3,462,663 | 8/1969 | Schiller | 318/314 X |
| 3,553,555 | 1/1971 | Morris et al. | 318/314 |
| 3,559,017 | 1/1971 | Dinger | 318/314 |
| 3,611,096 | 10/1971 | Sadashige et al. | 318/314 |
| 3,829,747 | 8/1974 | Woolfson et al. | 31/314 X |

Primary Examiner—G. Z. Rubinson
Attorney, Agent, or Firm—Burmeister, Palmatier & Hamby

[57] ABSTRACT

The disclosed system utilizes digital electronic programming to establish the rotational or translational speed of a motor driven member. The desired speed can be selected by manipulating a set of digital switches. A stable oscillator is employed to generate a high frequency signal which is processed by frequency dividers to produce a modulaton frequency signal. The modulation frequency is supplied to an optical encoder having a rotary shaft adapted to be connected to a rotary member, the speed of which is to be controlled. The encoder is constructed and arranged to produce a phase variable output signal at the modulation frequency, the phase of such output signal being variable as a function of the shaft angle. The high frequency signal is also processed by digital circuits under the control of the digital selector switches to produce a variable reference frequency signal having a frequency corresponding to the modulation frequency plus or minus a number which is established by the setting of the selector switches. The speed control system includes means for comparing the frequency of the phase variable signal with the frequency of the reference signal. This comparison circuit controls a motor operating circuit which increases or decreases the speed of the drive motor for the rotary member, until the phase variable signal has the same frequency and phase as the reference signal. The digital generation of the reference frequency signal insures that its frequency is established and maintained with an extremely high degree of accuracy.

22 Claims, 11 Drawing Figures

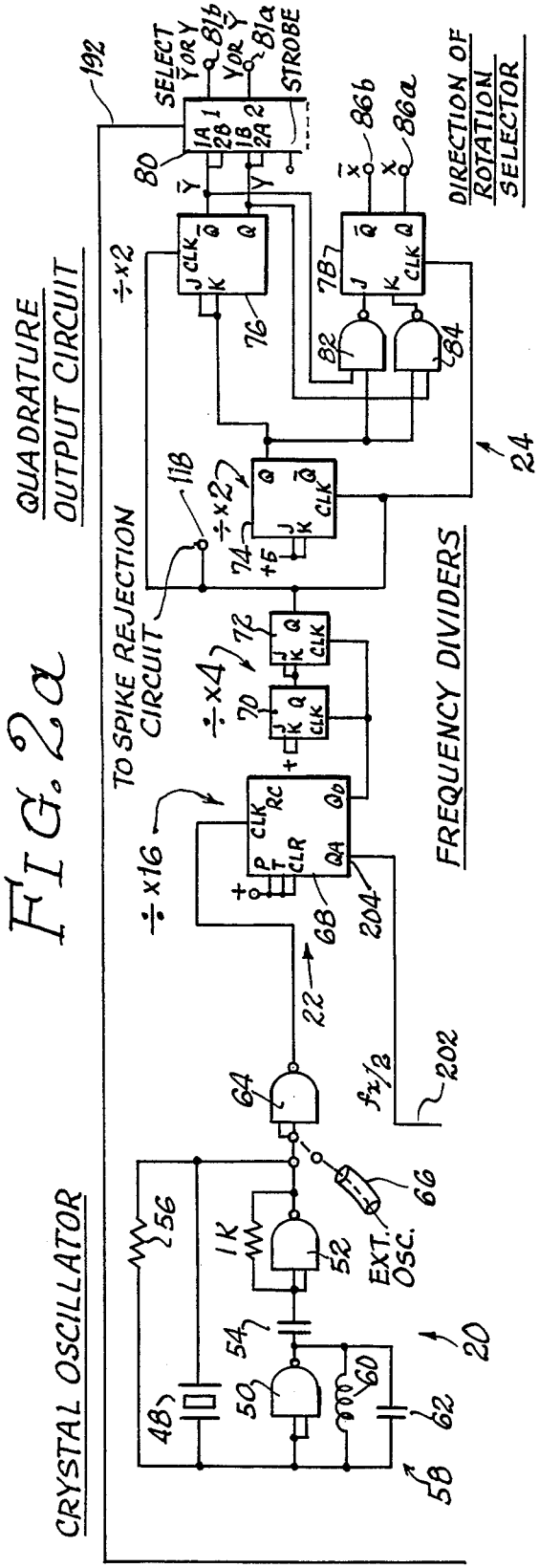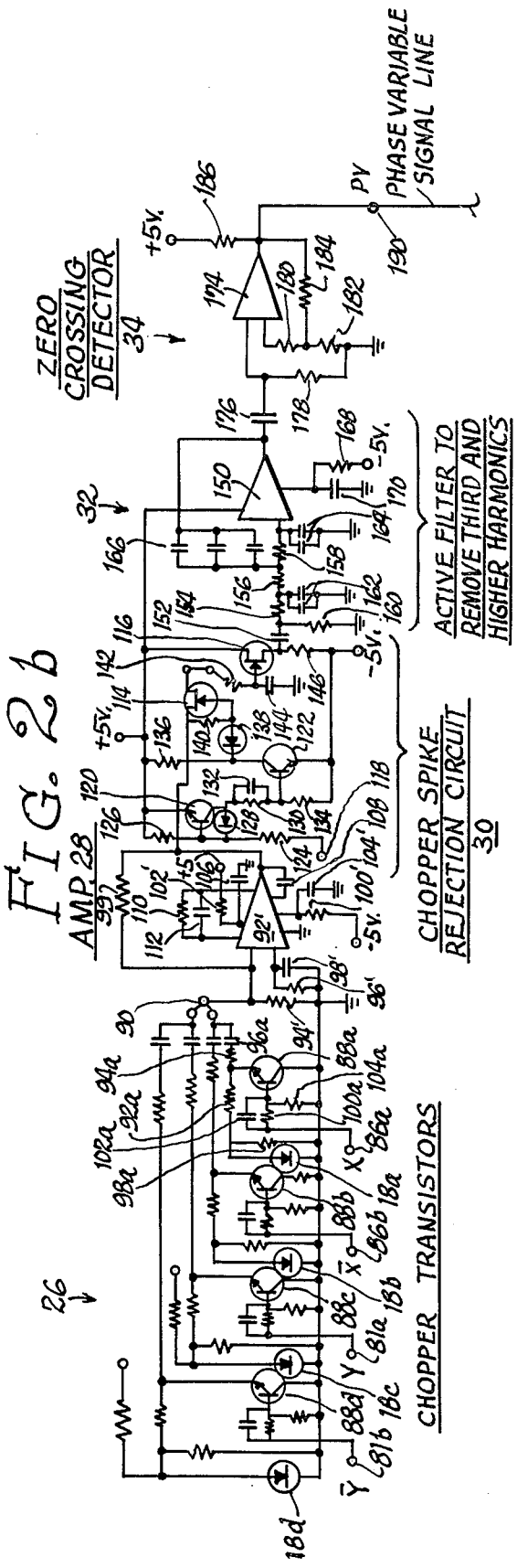
FIG.2a
FIG.2b

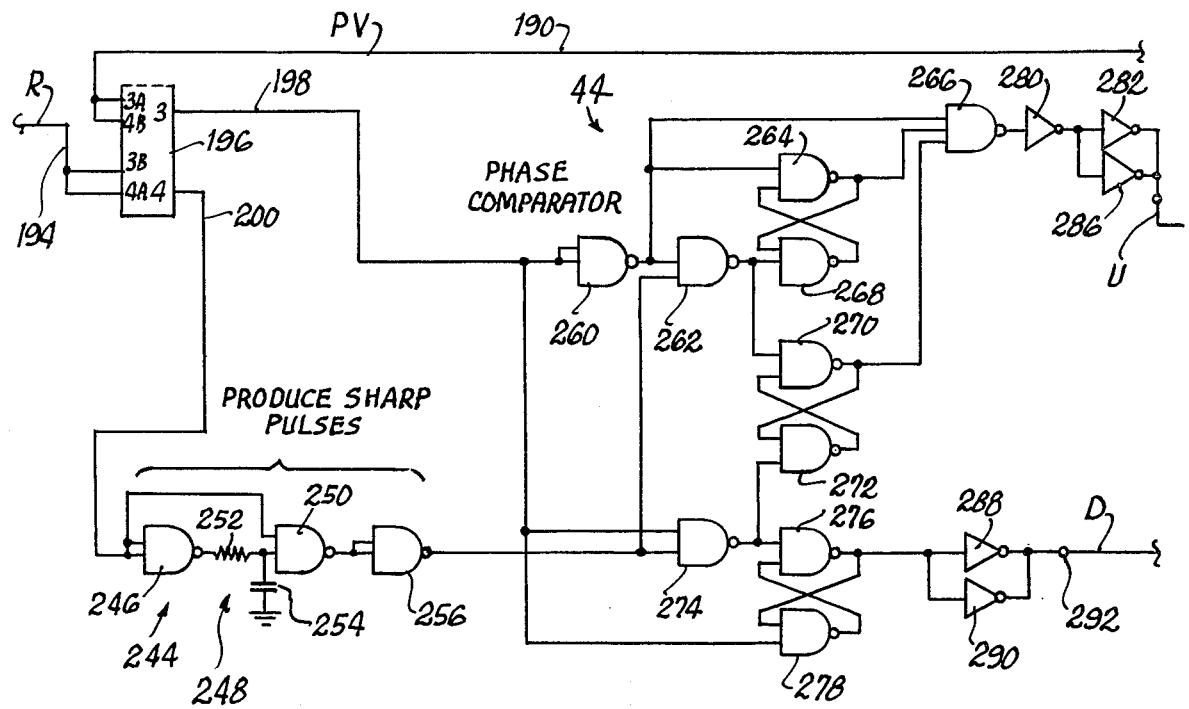
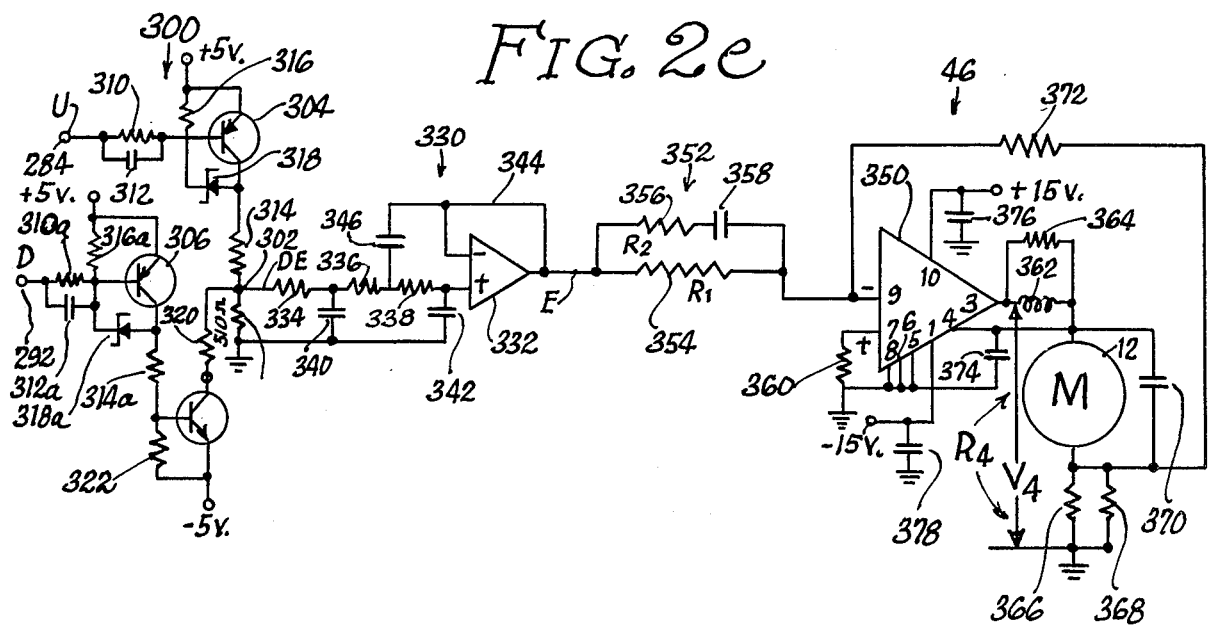

Fig. 3
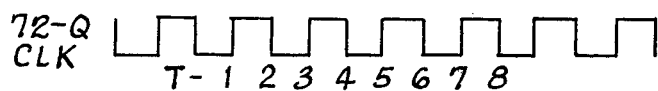
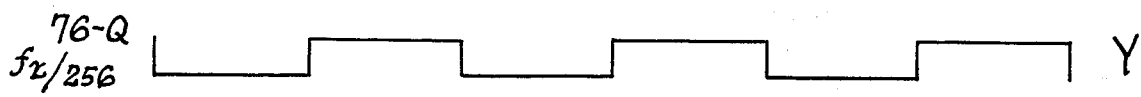
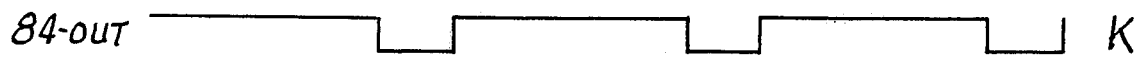
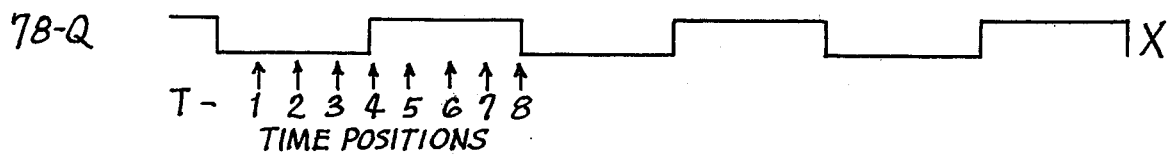

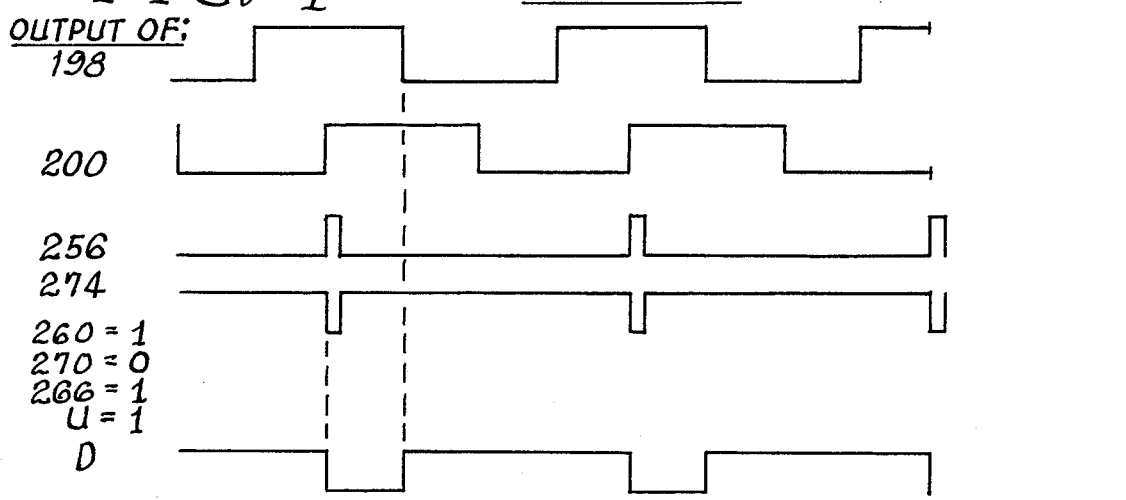

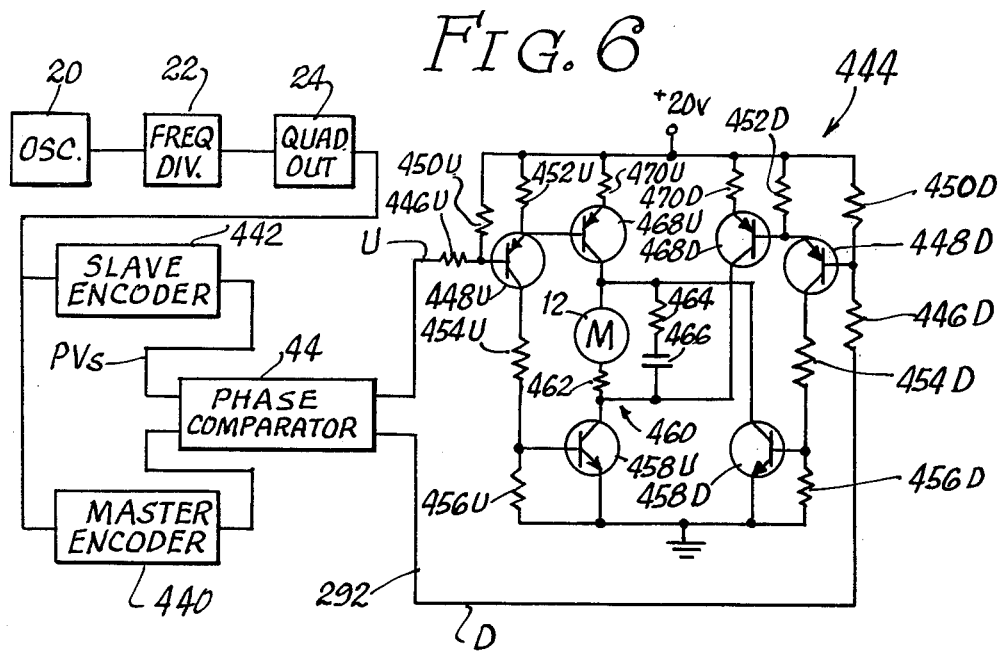
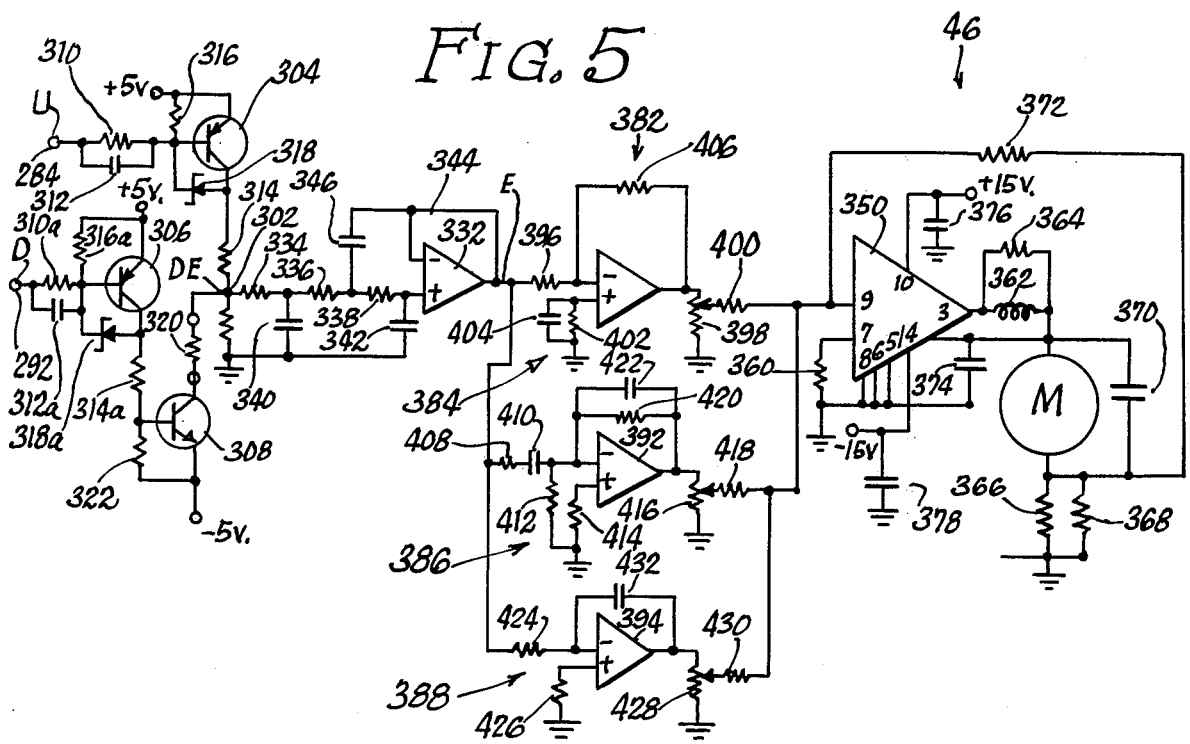

WIDE RANGE, HIGH ACCURACY, ELECTRONICALLY PROGRAMMED SPEED CONTROL SYSTEM

This invention relates to a new and improved speed control system or apparatus.

One object of the present invention is to provide a new and improved speed control system capable of achieving an extremely high degree of precision and accuracy, so that the system will be well suited for the most exacting applications, such as use in conjunction with the motor drives of astronomical tracking systems, as well as precision radar and laser tracking systems.

A further object is to provide a new and improved speed control system which is capable of achieving an extremely wide range of speed variation, while maintaining extremely high accuracy throughout such range.

Another object is to provide a new and improved speed control system which is constructed so that the desired speed can be selected digitally, by setting the numerical value of the desired speed on a set of digital controls. In this way, the speed can be selected with a high degree of certainty and precision, while minimizing the possibility of errors in setting the speed selector controls.

It is a further object to provide a new and improved speed control system which makes it possible to establish and control the phase angle as well as the speed of the device whose speed is being regulated. Another object is to provide a new and improved speed control system which utilizes solid state electronics and is extremely compact and reliable, while also being relatively low in cost.

The speed control system of the present invention is adapted to control the speed of a motor drive for a rotary shaft, a translatory member, or any other movable member. Whenever the speed control system is discussed herein with reference to a rotary shaft or drive, it will be understood that the invention is equally applicable to a translatory drive, or any other drive for a movable member.

The present invention preferably utilizes a positional encoder, which provides electrical signals representing the position of a rotatable shaft or some other movable member. The encoder preferably produces a phase variable signal, in which the phase of the signal is variable as a function of the shaft angle or position. The encoder may be supplied with a high frequency input signal or signals, which are converted into the phase variable signal by the encoder. Thus, the encoder effectively modulates the phase of the input signal or signals as a function of the shaft angle or position, so as to produce the phase variable output signal.

The speed control system preferably includes a variable reference frequency source or generator for producing a signal at a reference frequency which can be varied in accordance with the desired speed to be established and maintained by the speed control system. Preferably, the reference frequency signal and the input signal to the encoder are derived from a single stable oscillator or other signal source. The signals from such source are preferably processed electronically to produce a variable reference frequency which differs from the original or base frequency by an amount which corresponds to the desired speed. The input signals supplied to the encoder are at the base frequency.

The speed control system preferably comprises comparison means for comparing the frequency of the reference frequency signal with the phase variable signal. When the movable member of the encoder is being rotated or otherwise driven, the phase of the output signal is continuously advanced or retarded, due to the continuing change in the position of the movable member. The changing phase of the phase variable signal in effect changes the frequency of such signal. In accordance with the present invention, a control signal is produced in accordance with any difference between the frequency or phase of the reference frequency signal and the frequency or phase of the phase variable signal. The control signal may be employed to change the speed of the motor drive so as to equalize the frequency and phase of the phase variable signal with the frequency and phase of the reference frequency signal. In this way, the desired speed of the movable member can be accurately established and maintained.

Digital switches or other electronic control elements are preferably employed to select the desired reference frequency. In this way, the numerical value of the desired speed can be set up on the digital controls.

The speed control system of the present invention may be arranged to produce a flexible and universal control system for general purpose use. In one arrangement, as just indicated, the desired speed or rate may be programmed by dialing the desired speed or rate on digital switches or other control elements. The speed control system may also provide for direct digital control of the speed or rate from an external computer or some other control system. This arrangement makes it possible to generate various velocity profiles. For example, a uniformly stepped digital input word can be used to approximate a low value constant acceleration.

In another arrangement, the reference frequency signals may be derived from an external source. This arrangement makes it possible to change the time base of the system over a narrow range. Such a provision is advantageous in certain astronomical applications, to make continuous corrections in a nearly constant rate, for compensation of atmospheric aberrations.

The high frequency input signals for the speed control system can be derived from a crystal controlled oscillator, or from a variable frequency oscillator, which makes it possible to adjust the oscillator frequency as desired.

If desired, a manually operable push button, or some other manually operable control, may be provided, for manually stepping the reference frequency through small steps. A continuously operable manual control can also be provided.

Another possibility is to derive the reference frequency signal from another encoder, so that the reference frequency represents the speed of a master shaft or other movable member. This modification results in a master-slave system, in that the speed and phase of the shaft or movable member to be controlled are brought to the speed and phase of the master shaft or movable member.

A suitable encoder is disclosed and claimed in the applicant's co-pending application, Ser. No. 262,596, filed June 14, 1972.

Further objects, advantages and features of the present invention will appear from the following description, taken with the accompanying drawings, in which:

FIG. 1 is a block diagram illustrating a speed control system to be described as an illustrative embodiment of the present invention.

FIGS. 2a, 2b, 2c, 2d and 2e, taken together, constitute a schematic circuit diagram of the illustrative speed control system.

FIGS. 3 and 4 are waveform diagrams illustrating the operation of the speed control system.

FIG. 5 is a schematic diagram of a modified motor control circuit having means for optimizing the control system for more universal usage.

FIG. 6 is a schematic diagram of a modified motor control circuit in which the motor is switched, such control circuit having a variety of applications but being shown in connection with a modified system having a master-slave mode of operation.

Figure 1:
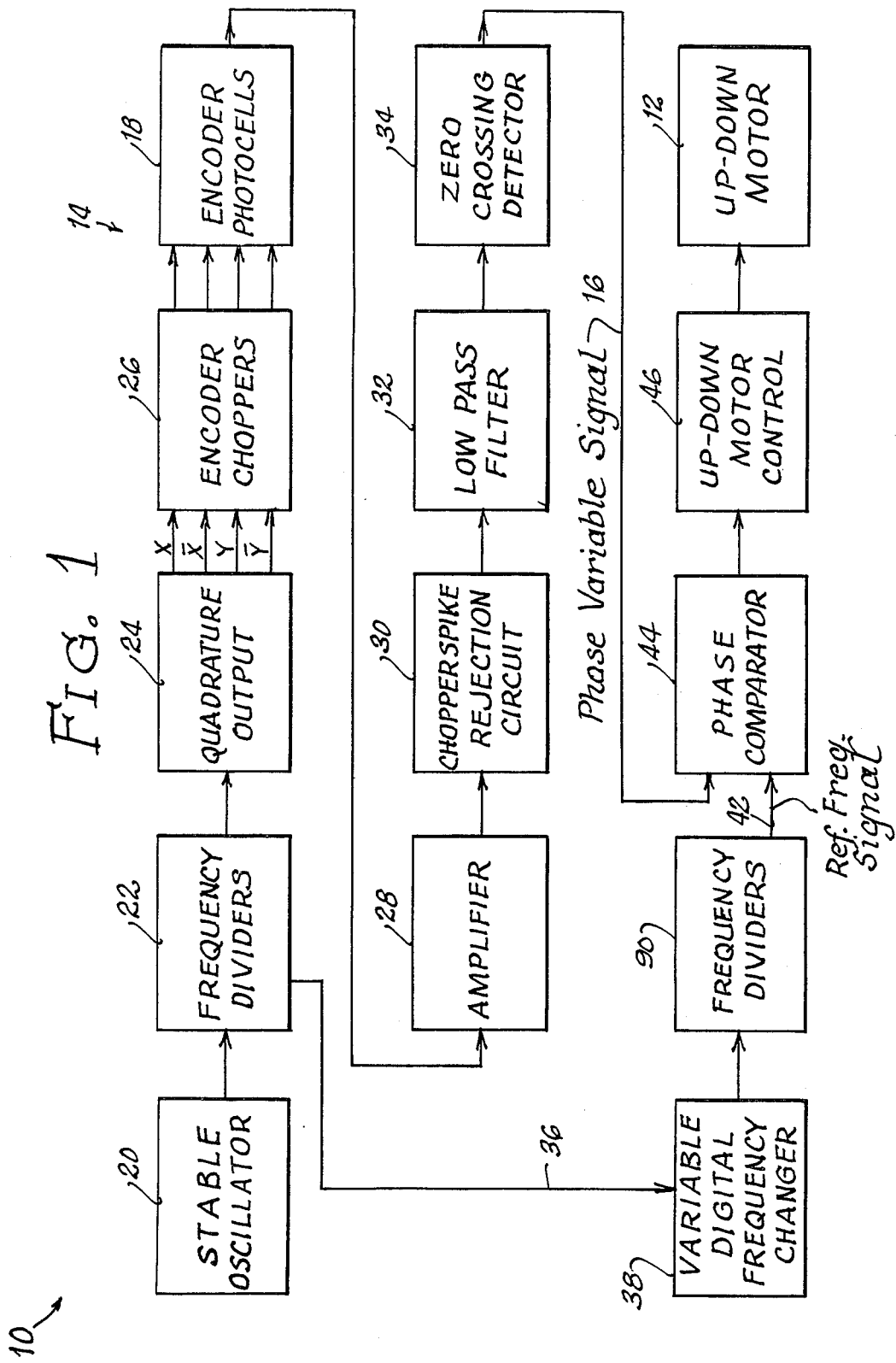

As just indicated, the block diagram of FIG. 1 illustrates a speed control system 10 adapted to control the speed of a shaft or some other movable member which is driven by a motor 12. An encoder 14 is provided to generate signals representing the position of the shaft or movable member.

The encoder 14 is constructed and arranged so as to modulate or vary the phase of high frequency input signals so as to produce a phase variable output signal on a signal line 16.

The encoder 14 may be of various types, but is illustrated as being of the optical type having encoder photocells 18 adapted to receive modulated light from an encoder disc, drum or some other movable encoding member. The encoder disc may be provided with sine and cosine tracks adapted to modulate light beams in accordance with the sine and cosine of 5,000 times the shaft angle.

The high frequency signals for driving or modulating the encoder 14 may be derived from a stable oscillator 20, which is preferably of the crystal controlled type. In this case, the oscillator 20 is arranged to produce signals at a fairly high multiple of the high frequency employed to drive the encoder 14. For example, a frequency of 52.5 kilohertz may be employed to drive the encoder 14, while the oscillator 20 may be arranged to generate signals at a frequency of 13.44 megahertz, the ratio between the frequencies being 256, which is the eighth power of 2.

A frequency divider system 22 is employed to derive the encoder drive frequency from the output of the oscillator 20. The frequency dividers 22 may be arranged to divide the input frequency from the oscillator 20 by 256.

In this case, the output of the frequency dividing system 22 is employed to drive a quadrature output system 24, adapted to produce sine and cosine outputs, designated X and Y, as well as inverted sine and cosine outputs, designated $\overline{X}$ and $\overline{Y}$. These quadrature signals are employed to drive a system of encoder choppers or modulators 26, which in turn modulate the encoder photocells 18.

The output from the encoder photocells 18 is processed electronically by passing such output successively through an amplifier 28, a chopper spike rejection circuit 30, a low pass filter 32 and a zero crossing detector 34. The output of the zero crossing detector 34 provides the phase variable signal and is connected to the phase variable signal line 16.

When the encoder is rotated or moved at a particular speed, the phase of the phase variable signal is advanced or retarded at a rate depending upon such speed. The phase is advanced for one direction of rotation and retarded for the other direction of rotation. The changing of the phase is equivalent to a change in the frequency of the phase variable signal, so that signals indicating the speed of the encoder can be derived by comparing the phase variable signal with a reference frequency signal of predetermined or known frequency.

In the system of FIG. 1, the reference frequency signal is derived from the output frequency produced by the stable oscillator 20. Rather than using the output of the oscillator 20 directly, a signal line 36 is connected to the frequency divider system 22 to derive a drive frequency which is a submultiple of the oscillator frequency. Such drive frequency is supplied to a variable digital frequency changing system 38, which produces an output frequency which differs by a variable amount from the input frequency, yet is fully stabilized.

A shown in FIG. 1, the variable frequency output from the frequency changing system 38 is supplied to an additional frequency dividing system 40 which completes the frequency division. The frequency divider system 40 has an output line 42 which provides the reference frequency signal.

The phase variable signal line 16 and the reference frequency signal line 42 are connected to the input of a phase comparator 44 which compares the two signals and produces output signals corresponding to any difference in phase. These output signals are supplied to an up-down motor control system 46 which is employed to control the speed of the motor 12. The effect of the entire system is to change the speed of the motor 12 until the phase of the phase variable signal on the line 16 is exactly the same as the phase of the reference frequency signal on the line 42. Thus, the speed of the motor is very precisely determined by the frequency of the reference frequency signal. By changing this frequency, the speed of the motor can be controlled as desired.

Figure 2C:
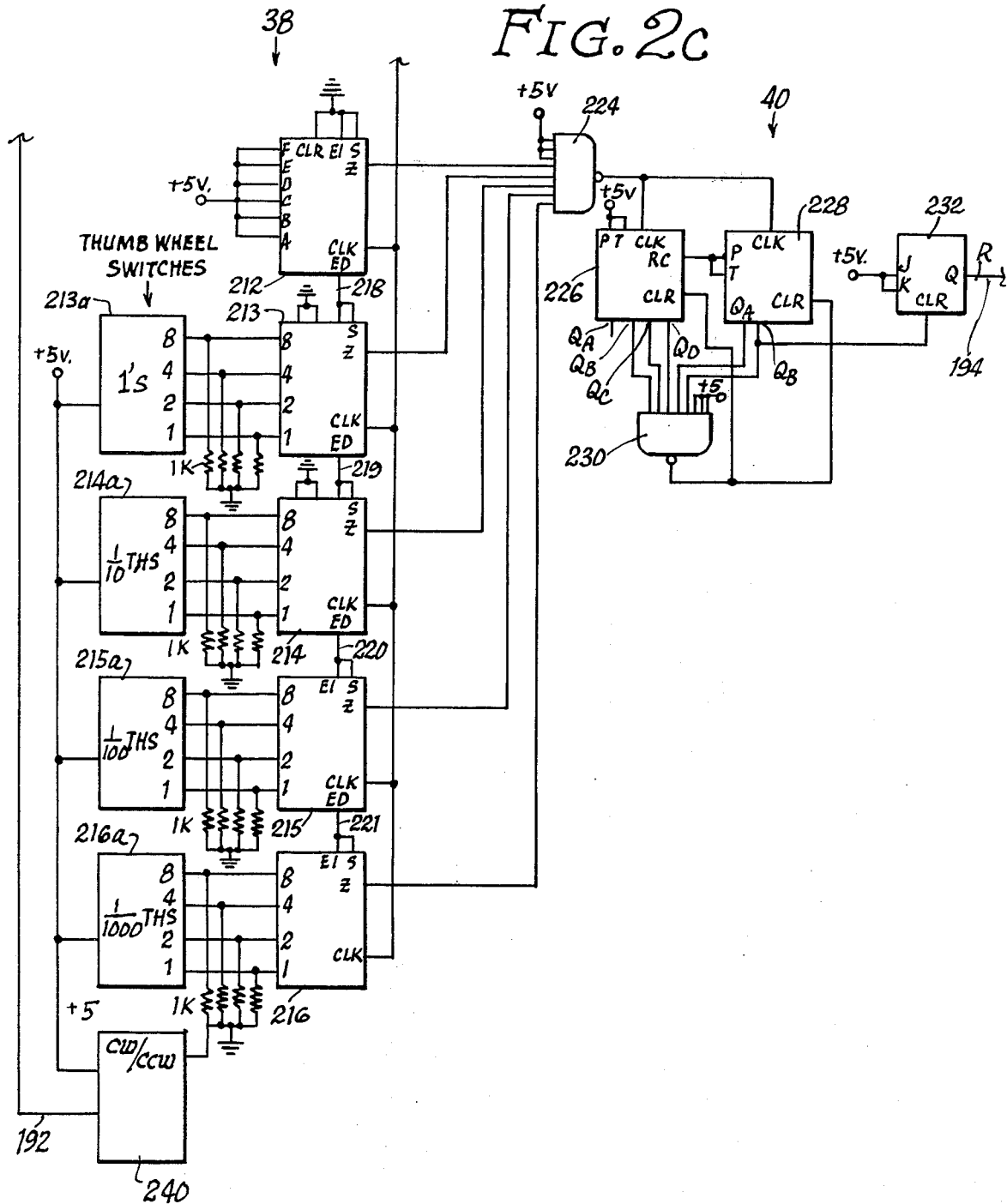

Additional details of the speed control system 10 will be evident from FIG. 2, which comprises FIGS. 2a–e. It will be seen from FIG. 2a that the oscillator 20 is of the crystal controlled type, having its frequency controlled by a crystal 48. The gain to produce oscillations is provided by first and second NAND gates 50 and 52, connected in cascade, with a coupling capacitor 54 therebetween. The crystal 48 is connected between the output of the gate 52 and the input of the gate 50. A resistor 56 may be connected across the crystal 48. As shown, a tuned circuit 58 is connected between the input and output of the gate 50. The tuned circuit 58 comprises an inductance coil 60 in parallel with a capacitor 62.

The oscillator 20 generates the time base for the speed control system, at a suitable frequency, such as 13.44 megahertz. This frequency was selected to provide speed variations in steps of 0.001 of a revolution per minute (RPM) with a 5,000 cycle encoder. With such an encoder, each revolution of the encoder disc produces 5,000 sine and cosine cycles.

The output of the oscillator 20 is connected to another NAND gate 64 which provides output pulses of square waveform and uniform amplitude. If it is desired to employ an external oscillator to provide the time base for the system, the output of such external oscillator may be supplied to the input of the gate 64 through a connecting cable 66.

The output of the gate 64 is employed to drive the frequency dividers 22, which may comprise a counter 68 and two J-K master-slave flip-flops 70 and 72, connected in cascade. The counter 68 may take the form of an integrated circuit adapted to divide by 16. The flip-flops 70 and 72 are connected so that together they divide by 4.

The output of the flip-flop 72 drives the quadrature output circuit 24 which produces sine and cosine signals X and Y, as well as inverted sine and cosine signals $\overline{X}$ and $\overline{Y}$. The quadrature output circuit 24 also divides the frequency of the signals by 4.

As shown, the quadrature output circuit 24 comprises three additional J-K flip-flops 74, 76 and 78 having their clock inputs connected to the output of the flip-flop 72. The flip-flop 74 divides the frequency by 2. It will be seen that the Q output of the flip-flop 74 is connected directly to the J and K inputs of the flip-flop 76, which again divides the frequency of the signal by 2. The Q and $\overline{Q}$ outputs of the flip-flop 76 provide cosine and inverted cosine output signals Y and $\overline{Y}$ at the desired output frequency, which in this case is 52.5 kilohertz.

To provide for changing the direction of rotation of the motor 12, the Q and $\overline{Q}$ outputs of the flip-flop 76 are connected to inputs of a commutating flip-flop or data selector 80 which provides the actual cosine and inverted cosine outputs Y and $\overline{Y}$ at output terminals 81a and b. [By changing the binary state of select input 192 on the data selector 80, the polarity of these outputs can be reversed.]

To provide for the generation of the sine and inverted sine outputs X and $\overline{X}$, NAND gates 82 and 84 are connected to the J and K inputs of the flip-flop 78. One input of each gate 82 and 84 is connected to the Q output of the flip-flop 74. The remaining inputs of the gates 82 and 84 are connected to the $\overline{Q}$ and Q outputs of the flip-flop 76. The Q and $\overline{Q}$ outputs of the flip-flop 78 provide the sine and inverted sine outputs X and $\overline{X}$, at the desired frequency, which in this case is 52.5 kilohertz. These signals appear at output terminals 86a and b.

The waveform diagrams of FIG. 3 illustrate the operation of the quadrature output circuit 24. The signal designated 72-Q appears at the Q output of the flip-flop 72 and is applied to the clock inputs of the flip-flops 74, 76 and 78. This signal is also designated $f_x/64$, because it is at the crystal oscillator or base frequency $f_x$ divided by 64.

The signal designated 74-Q appears at the Q output of the flip-flop 74 and is applied to the J and K inputs of the flip-flop 76, as well as one input of each of the gates 82 and 84. This signal has a frequency of $f_x/128$.

The signal designated 76-Q appears at the Q output of the flip-flop 76 and has a frequency of $f_x/256$. This signal provides the cosine output Y. It is applied to one input of the gate 84. The inverted cosine output $\overline{Y}$ is applied to the input of the other gate 82.

The signal designated 82-OUT appears at the output of the gate 82. It is designated J because it is applied to the J input of the flip-flop 78. The signal designated 84-OUT appears at the output of the gate 84 and is also designated K because it is applied to the K input of the flip-flop 78.

The signals 78-Q and 78-$\overline{Q}$ appear at the Q and $\overline{Q}$ outputs of the flip-flop 78. These signals are also designated X and $\overline{X}$ because they are employed as the sine and inverted sine outputs X and $\overline{X}$.

In the quadrature circuit 24, the X and Y output signals, and also the $\overline{X}$ and $\overline{Y}$ output signals, are clocked by the negative-going edges of the 72-Q signals to minimize error in the 90° phasing of Y relative to X. For brevity and convenience, these 72-Q signals, which are used as the clock signals, will be referred to as CLK.

In FIG. 3 eight time positions T1-8 have been indicated, corresponding to successive pulse edges of the signal CLK. At time position T1, CLK changes from binary 0 to binary 1 while the J input is 0 and the K input is 1. This causes a binary 0 to be stored in the master flip-flop section of the master-slave flip-flop 78. When CLK changes from a binary 1 to a binary 0 at T2, the zero state of the master flip-flop is shifted to the slave flip-flop of 78 so that the output 78-Q is commanded to a zero state. However, 78-Q is already 0, so that no change of state occurs.

At time position T3, J is 1 and K is 1 so that a binary 1 is stored in the master. At T4, CLK goes to 0, so that the slave is commanded to change states. Thus, the output 78-Q changes from 0 to 1.

At T5 in FIG. 3, J is 1 and K is 0. Therefore, at position T6, the output 78-Q is commanded to a binary 1 state. However, it is already in a binary 1 state, so that no change results.

At T7, J is 1 and K is 1, which is the same situation that existed at T3. Thus, a change in state is dictated for time position T8, when CLK goes to 0, so that the output 78-Q goes from 1 to 0.

This pattern continues indefinitely. If noise or some other outside influence disturbs this sequence, the circuit is self-correcting, because of the two forced states in each sequence. The output 78-$\overline{Q}$ is always the counterpart or inverse of the output 78-Q. Thus, these outputs provide the sine and inverted sine outputs X and $\overline{X}$.

As previously indicated, the high frequency signals X, $\overline{X}$, Y and $\overline{Y}$ are employed to chop or modulate the positional signals developed by the encoder photocells 18. As shown in FIG. 2b, the preferred embodiment utilizes four photocells 18a, 18b, 18c and 18d, which are illustrated as being of the photovoltaic type but may be of any suitable type. The photocells are adapted to receive light beams which supply positional information as to the position of the encoder disc or member. Thus, for example, one photocell may be opposite a sine track on the encoder disc so that this photocell develops a signal which varies in accordance with the sine of the angular position of the disc. Another photocell may be opposite a cosine track on the disc, so that this photocell develops a signal corresponding to the cosine of the disc angle. The other two photocells may be opposite clear or transparent tracks. This arrangement makes it possible to balance or cancel out the direct current components of the photocell signals, so that the output will not be sensitive to variations in the direct current component. For example, the photocells 18a and 18c may be opposite the cosine and sine tracks, while the photocells 18b and 18d are opposite the clear tracks.

The chopping or modulating system 26 combines the time base signals X, $\overline{X}$, Y and $\overline{Y}$ with the positional signals developed by the photocells 18a-d. It will be seen that the output terminals 86a, 86b, 81a and 81b for the X, $\overline{X}$, Y and $\overline{Y}$ signals appear in FIG. 2b, as well as in FIG. 2a, to apply these signals to the chopping system 26. In the illustrated system 26, chopping transistors 88a-d are employed to chop the photocell signals in response to the time base signals. The respective transistors 88a-d are associated with the respective photocells 18a-d. It will suffice to describe the circuit involving the photocell 18a and the transistor 88a, because the individual circuits for the other photocells are the same.

The outputs of all of the photocells 18a-d are connected to a common output terminal 90, so that the outputs of the photocells are additively combined. It will be seen that one side of the photocell 18a is connected to ground, while the other side is coupled to the output terminal 90 through a series circuit comprising two resistors 92a and 94a and a coupling capacitor 96a. A load resistor 98a is connected across the photocell 18a.

The collector-emitter path of the chopping transistor 88a is connected between ground and the junction of the resistors 92a and 94a. Thus, when the transistor 88a is conductive, it tends to short circuit the output of the photocell 18a. As shown, the X input terminal 86a is coupled to the base of the transistor 88a by a parallel circuit comprising a resistor 100a and a capacitor 102a in parallel. A resistor 104a may be connected between the transistor base and ground.

The chopper or modulation system 26 utilizes the principle represented symbolically by the following trigonometric relationship:

$$\sin wt \cos \theta + \cos wt \sin \theta = \sin (wt + \theta)$$

In this equation, $w = 2\pi f$ where $f = 52.5$ kHz. The angle $\theta$ is the phase angle within each cycle of the encoder disc. These are 5,000 cycles around the disc, so that each cycle comprises 1/5,000 of a revolution.

More precisely, the combination achieved by the illustrative chopping or modulation system 26 is represented by the following expression:

$$X (1 + \cos \theta) + \overline{X} + Y (1 + \sin \theta) + \overline{Y}$$

This combination can be reduced mathematically to:

$$\sin (wt + \theta) - \tfrac{1}{3} \sin 3 (wt + \theta) + 1/5 \sin 5 (wt + \theta)$$

The odd harmonic terms are introduced as a result of the square wave modulation or chopping action activated by the X and Y signals.

The summation of the four modulated photocell signals occurs at the terminal 90, as previously indicated. This process minimizes dissimilar gain factors and dissimilar propagation times which might otherwise introduce error in the generation of the phase variable signal.

As previously indicated, the combined output signals from the chopper or modulation system 26 are amplified by the amplifier 28, and then are processed by the chopper spike rejection circuit 30. As shown in FIG. 2b, the amplifier 28 utilizes an operational amplifier module 92' having one input terminal connected to the output terminal 90 of the modulation system 26. A load resistor 94' may be connected between the terminal 90 and ground. As shown, the parallel combination of a resistor 96' and a capacitor 98' is connected between ground and the other input terminal of the operational amplifier 92'.

The illustrated operational amplifier 92' utilizes a feedback resistor 99 connected between the output and the first input, together with power supply filter resistors 100' and 102', power supply filter capacitors 104' and 106, a feedback capacitor 108, and a feedback resistor 110 in parallel with a capacitor 112.

The chopping of the photocell signals introduces chopping spikes into the combined output signals. These chopping spikes are suppressed or rejected by the circuit 30. In the circuit as illustrated in FIG. 2b, the chopper spikes are rejected by utilizing a series switch in the form of a field effect transistor (FET) 114 connected between the output of the operational amplifier 92' and the input of a source follower utilizing another FET 116. The signals to actuate the FET switch 114 are derived from the time base circuit of FIG. 2a. In this case, they are derived from a terminal 118 connected to the Q output of the flip-flop 72. The frequency of the signals at the terminal 118 is $f_x/64$, such signals being shown on the first line of FIG. 3. The terminal 118 also appears in FIG. 2b.

In the chopper spike rejection circuit 30 of FIG. 2b, the signals from the terminal 118 are supplied to the FET switch 114 by two driver transistors 120 and 122, adapted to produce output signals which switch between —5 and +5 volts. As shown, an input resistor 124 is connected between the terminal 118 and the base of the transistor 120. Another resistor 126 is connected between the base and the +5 volt terminal.

It will be seen that a diode 128 is connected between the collector and the base of the transistor 120. The emitter of the transistor 120 is connected to the +5 volt terminal.

As shown, a resistor 130 is connected between the collector of the transistor 120 and the base of the transistor 122. A capacitor 132 is connected in parallel with the resistor 130. Another resistor 134 is connected between the base and the emitter of the transistor 122, such emitter being connected to the —5 volt terminal.

It will be seen that a load resistor 136 is connected between the collector of the transistor 122 and the +5 volt terminal. A diode 138 is connected between such collector and the input electrode or gate of the FET switch 114. In this case, a resistor 140 is connected between the gate and the drain of the FET 114. The source electrode of the FET 114 is connected through a resistor 142 to the gate of the source follower FET 116. As shown, a capacitor 144 is connected between the gate and ground. A load resistor 146 is connected between the source of the FET 116 and the —5 volt terminal.

The collector of the transistor 122 switches between approximately +5 volts when the transistor is nonconductive, and —5 volts when the transistor is conductive. When the collector is in its high state of +5 volts, the FET switch 114 conducts, so that the output of the amplifier 28 is supplied to the gate or input electrode of the source follower FET 116. Accordingly, the output of the source follower FET 116 follows the amplifier output.

When the collector of the transistor 122 is in its low state of —5 volts, the FET switch 114 is nonconductive or open. During this time period, the gate of the source follower FET 116 holds the last voltage level which was present on the output of the amplifier 28, prior to the opening of the switch. Such holding action occurs during the time when chopper feed-through spikes are present on the output of the amplifier 28. Thus, the chopper spikes are removed or rejected. In addition, if there are dissimilar rise, fall or propagation times among the four chopper transistors 88a-d, the chopper spike rejecting process tends to remove any associated error by normalizing or standardizing their switching actions by superimposing the switching action of the FET switch 114.

The output of the source follower FET 116 is supplied to the input of the low pass filter 32, which may assume various forms, but is shown as a third-order active filter utilizing an operational amplifier 150. As shown, a coupling capacitor 152 and three filter resistors 154, 156 and 158 are connected between the output of the source follower FET 116 and the inverted input of the amplifier 150. A return resistor 160 is connected between ground and the junction between the capacitor 152 and the resistor 154. Filtering capacitors 162 are connected in parallel between ground and the junction between the resistors 154 and 156. Filtering capacitors 164 are connected in parallel between ground and the inverted input of the amplifier 150. In addition, the filter circuit 32 utilizes feedback capacitors 166 connected between the output of the amplifier 150 and the junction between the resistors 156 and 158. A power supply filtering resistor 168 and a power supply filtering capacitor 170 are connected to the amplifier 150.

The active filter 32 reduces third and higher harmonics to negligible levels, leaving only the fundamental frequency signal at the output of the operational amplifier 150. Such fundamental frequency output may be represented by the following expressions:

$$k \sin (wt + \theta)$$

The output of the filter 32 is supplied to the input of the zero crossing detector 34, which, as illustrated in FIG. 2b, utilizes a comparator module 174. A coupling capacitor 176 is connected between the output of the amplifier 150 and one input of the comparator 174. As shown, a return resistor 178 is connected between such input and ground. It will be seen that resistors 180 and 182 are connected between the other input and ground. A feedback resistor 184 is connected between the output of the comparator 174 and the junction between the resistors 180 and 182. A load resistor 186 is connected between the output and the +5 volt terminal.

The zero crossing detector 34, utilizing the comparator 174, produces a TTL-compatible, square wave, phase-variable signal PV. Slight positive feedback is used in the comparator circuit to provide voltage trigger point hysteresis, and to insure singular output transitions at each signal crossover of the input sine wave signal.

The output of the zero crossing detector 34 is connected to a phase variable signal line or terminal 190, which is also designated PV.

As previously indicated in connection with FIG. 2a, the Y and $\overline{Y}$ signals can be interchanged by operating the integrated circuit 80, which may comprise a commutating flip-flop or data selector. This circuit 80 is part of the direction of rotation selector system.

The data selector 80 is operated in response to signals applied to an input line 192 which may also be designated select. These signals are provided by the direction of rotation control system which makes it possible to select between clockwise and counterclockwise rotation. When the select input line 192 is connected to ground, so that the select input voltage is 0, the inputs designated 1A and 2A of the data selector 80 are connected to the outputs designated 1 and 2. When the select input line 192 is supplied with the high state voltage, the inputs designated 1B and 2B are connected to the outputs designated 1 and 2. Changing the select input level thus has the effect of interchanging the Y and $\overline{Y}$ signal outputs. When these signals are interchanged, the action of the chopping or modulating system 26 is changed, as represented by the following alternate expression:

$$X (1 + \cos \theta) + \overline{X} + \overline{Y} (1 + \sin \theta) + Y$$

This combination, after filtering, produces a filter output representable by $\sin (wt - \theta)$ instead of by $\sin (wt + \theta)$. Whereas counterclockwise rotation produces a positively increasing encoder phase angle ($\theta$) when the select input is zero, clockwise rotation produces a positively increasing phase angle when the select input is in a high state.

The direction of rotation control system also interchanges the phase variable signal output PV and the reference frequency signal output R, in addition to interchanging the Y and $\overline{Y}$ signals. FIG. 2d illustrates the means employed in the illustrative speed control system to interchange PV and R. The phase variable output line PV is also designated 190, as previously mentioned, while the reference frequency line R will be designated 194. It will be seen that the PV line 190 and the R line 194 are connected to the alternative inputs of a data selector 196, which is combined with the data selector 80, shown in FIG. 2a. Thus, the signal of the select line 192 controls the data selector 196, as well as the data selector 80. When the select input signal on the line 192 is 0, the phase variable signal PV is transmitted to output terminal 3 of the data selector 196. An output line 198 is connected to this terminal. The reference frequency signal R is transmitted to output terminal 4 of the data selector 196. An output line 200 is connected to this output terminal. When the select input signal on the line 192 is high, PV is transmitted to terminal 4, and thus is applied to the output line 200, while R is transmitted to terminal 3, and thus is applied to the output line 198. Thus, PV and R are interchanged as applied to the phase detector or comparator 44, described in connection with FIG. 1. A lagging phase relationship between PV and R will produce a positive error voltage from the phase comparator 44 with one select signal input state, and a negative error voltage for the other select input signal state.

The speed control system is preferably arranged so that the encoder will always rotate in a direction which produces a positively increasing phase variable signal PV, so that the PV signal will always be 52.5 kilohertz or greater. This arrangement matches the characteristics of the generating system for producing the reference frequency signal R. Such generating system is arranged to produce frequencies of 52.5 kilohertz or greater, as will be described in greater detail presently.

In the direction of rotation control system, interchanging the signals Y and $\overline{Y}$ satisfies the condition of always having an increasing phase for both directions of rotation. Interchanging R and PV satisfies the "sense" requirements of the error signal correction generated by the phase comparator 44. Thus, interchanging R and PV establishes the correct polarity of the error signal.

The sine and cosine tracks on the encoder disc or other member produce sine and cosine photocell signals. These encoder tracks should be shaped so that such sine and cosine signals have sinusoidal waveforms.

To recapitulate, the system shown in FIGS. 2a and 2b produces a phase variable signal PV having a frequency of 52.5 kilohertz, plus or minus the photocell frequency. Due to the arrangement of the direction of rotation control system, the phase variable signal PV always has a frequency of 52.5 kilohertz, plus the photocell frequency.

FIG. 2c illustrates the details of the illustrative circuits for producing the reference frequency signal R, which in this case is at a frequency of 52.5 kilohertz, plus an increment which is proportional to the desired speed or rate at which the motor 12 is to be driven. It will be understood that the encoder disc or member is driven at the same speed.

The circuits illustrated in FIG. 2c include the variable digital frequency changing circuits 38 and the frequency dividing circuits 40 refered to in connection with FIG. 1. The frequency changing circuits 38 are preferably synchronized with the signals generated by the crystal controlled oscillator 20. In this case, clock pulses to synchronize the frequency changing circuits 38 are derived from the counter 68 of FIG. 2a by means of a signal line 202 which is shown in both FIG. 2a and FIG. 2c. The counter 68 has an output terminal 204 which is connected to the signal line 202 and is adapted to supply pulses at a frequency of $f_x/2$, where $f_x$ is the frequency of the pulses generated by the crystal oscillator 20. Thus, the clock pulses on the signal 202 are at a frequency of 13.44/2 or 6.72 megahertz.

The frequency changing circuit 38 utilizes a system of synchronous rate multipliers 212, 213, 214, 215 and 216, which may be in the form of integrated circuits. The rate multiplier 212 contains synchronous counter system which divides by 64. Each of the rate multipliers 213, 214, 215 and 216 contains a synchronous counter system which divides by 10. The rate multipliers 212–216 are connected in cascade, so that the complete series of rate multipliers divides the input frequency by a factor of 640,000.

A system of selector controls is associated with the rate multipliers 213–216, for the purpose of selecting the speed or rate to be established by the speed control system. In this case, the selector controls take the form of 4 ten-position switches 213a, 214a, 215a and 216a. Thumbwheel switches are convenient for this purpose. Each of the switches 213a–216a is adjustable to ten positions which may be designated 0–9. These switches may be calibrated directly in terms of the revolutions per minute to be established by the speed control system. While any desired speed range may be employed, the illustrated control system has a range of 0 to 9.999 RPM in steps of 0.001 RPM. Thus, the switches 213a–216a establish the units, tenths, hundredths and thousandths of a revolution per minute.

Each of the switches 213a–216a is adapted to receive voltage from the +5 terminal and to supply such voltage in a selective manner to digital control terminals designated 1, 2, 4 and 8, connected to corresponding terminals on the associated rate multipliers 213–216. By supplying voltage to various combinations of the digital terminals, the input word to the corresponding rate multiplier can be varied from 0 to 9.

The signal line 202 is connected to each of the rate multpliers 212–216, so as to supply clock pulses to all of the multipliers. The rate multipliers 212–216 are connected in cascade by means of signal lines 218, 219, 220 and 221.

The rate multipliers 212–216 have Z outputs which are connected to the inputs of a multiple NAND gate 224, functioning as a pulse summation device.

The first rate multiplier 212 is permanently wired to have a digital input word of 63. Thus, the rate multiplier 212 has its inputs A, B, C, D, E and F connected to the +5 volt terminal. These inputs correspond to input word components of 1, 2, 4, 8, 16 and 32. All of these inputs add up to 63.

In general, the Z output of the rate multiplier 212 will have a frequency of $f_{CLK}$ N/64, when $f_{CLK}$ is the signal applied to the clock input, and N is the digital input word. Thus, in the system shown, the Z output frequency of the rate multiplier 212 is $$\frac{63}{64}\left(\frac{f_x}{2}\right).$$

A more precise description is that the Z output of 212 consists of 63 output pulses for each 64 clock pulses. Thus, every 64th pulse is missing. The decade rate multipliers 213, 214, 215 and 216 are connected in cascade with 212. If any of the Z outputs of the circuits 213 through 216 produces pulses, these pulses will occur in the gaps or missing pulse intervals of the Z output from the rate multiplier 212.

If the rate multipliers 212 and 213 are considered together, 213 can fill 0 to 9 of every ten gaps left by 212. Similarly, 214 can fill 0 to 9 of every ten "gaps" left in the combined Z pulse trains of 212 plus 213. If M is used to represent the total four-digit decimal number set on the thumbwheel switches 213a–216a, the frequency produced at the output of the pulse summation device 224 can be represented by:

$$\frac{630,000 + M}{640,000}\left(\frac{f_x}{2}\right)$$

The rate multiplier Z output signals are negative pulses which never occur coincidentally, so 224 acts here as a pulse-summing device.

The output of the pulse-summing device 224 is supplied to the frequency dividing system 40 which is adapted to divide by 63, and then by 2. Thus, the frequency dividing system 40 comprises counters 226 and 228, connected in association with a multiple NAND gate 230 so as to divide by 63. The output of this circuit is connected to the clock input of a J-K master-slave flip-flop 232, connected so as to divide by 2. The output of the flip-flop 232 provides the reference frequency signal R to the output line 194, previously referred to in connection with FIG. 2d.

Due to the successive divisions by 63 and 2, the frequency $f_R$ of the reference frequency signal R is given by the following expressions:

$$f_R = \frac{630,000 + M}{640,000} \frac{f_x}{2} \frac{1}{63 \times 2}$$

$$= \frac{f_x}{256} + \frac{Mf_x}{63 \times 2,560,000}$$

$$= 52,500 + M\frac{5}{60}$$

The following three examples will illustrate this process:

EXAMPLE 1

Digital input = 0.000. M = 0. Gate 224 output frequency is:

$$\frac{630,000}{640,000} \left(\frac{f_x}{2}\right).$$

i.e, every 64th pulse is missing. $f_R = 52.5$ kHz.

EXAMPLE 2

Digital input = 9.999. M = 9999. Gate 224 output frequency is:

$$\frac{639,999}{640,000} \left(\frac{f_x}{2}\right).$$

Every 640,000th pulse is missing.
$f_R = $ 52.5 + 9999(5/60) = 53,333.25 Hz.

EXAMPLE 3

Digital input = 0.001. M = 1. Gate 224 output frequency is:

$$\frac{630,001}{640,000} \left(\frac{f_x}{2}\right).$$

$f_R = 52,500.08$ Hz.

The reference signal R may be viewed as a reference phase variable signal, in which case it will be seen that the phase of R actually advances in discrete steps rather than continuously. The system design can be manipulated to reduce the size of the "phase steps" to some arbitrarily small quantity, thereby closely approximating a continuous phase advance.

As previously indicated, the synchronous counter circuits contained in the rate multipliers 212, 213, 214, 215 and 216 divide the input clock frequency by the factors 64, 10, 10, 10, and 10 respectively. The overall frequency division of the rate multiplier string is therefore 640,000. With an input frequency of $f_x/2$ or 13.44/2 megahertz, the pattern of pulses generated by the combined Z outputs will repeat at least as often as $f_x/2$ 1/640,000, or 15 times per second.

At the lowest rate setting of 0.001 RPM, the phase of R is advanced so that the average frequency of R is increased by 5/60Hz. Since this additional frequency is achieved at the rate of 15 phase steps per second, it is seen that there are:

$$\frac{15 \frac{steps}{sec}}{\frac{5}{60} \frac{cycles}{sec}} = 180 \frac{steps}{cycle}$$

For the illustrative encoder, there are 5,000 cycles per revolution or 259.2 arc seconds per cycle. Each phase step is therefore equivalent to 259.2/180 = 1.39 arc seconds.

The number of phase steps per encoder cycle is a constant at 180 for all RPM settings. However, the number of steps per second is given by 15M.

As stated above, the number of phase steps in R per encoder cycle could be increased by design. Similarly, the number of phase steps per second could be increased if desired. However, in actual use of the illustrative system, there was no apparent step motion in the encoder shaft even at the lowest rate setting of 0.001 RPM. The mechanical time constant of the motor-encoder rotor without any external load was approximately 50 milliseconds. Thus, with 15 steps per second or 66 milliseconds between steps, the already infinitesimal 1.39 arc-second steps are very effectively smoothed out.

In considering the number of changes per second in the command signal R, one should not be misled to believe that error corrections are available at such slow rates. The phase comparison of PV and R, which is carried out by the error feedback system, is performed at 52.5 kHz or greater frequencies for all rate settings.

As previously indicated in conjunction wth FIG. 2d, the output lines 190 and 194 for the phase variable signal PV and the reference frequency signal R are connected to the commutating data selector 196, which is adapted to interchange these signals between the output lines 198 and 200. The data selector 196 is part of the direction of rotation control system, which may be controlled in response to the operation of a control element, such as a switch 240, shown in FIG. 2c. This switch is also designated CW/CCW, to indicate that the switch controls between clockwise and counterclockwise rotation. The switch 240 is connected to the control line 192, which also appears in FIG. 2a and is connected to the data selector 80. The switch 240 is adapted to connect the control line 192 to the +5 volt terminal, or to ground.

As previously indicated, the phase variable signal PV and the reference frequency signal R are applied to the signal lines 198 and 200. These signals may be interchanged by the operation of the data selector 196. The signal lines 198 and 200 carry the signals to the phase comparator or detector circuit 44, referred to in connection with FIG. 1. Details of the illustrative phase comparator circuit 44 are shown in FIG. 2d.

It will be seen that a pulse sharpening circuit 244 is connected into one of the signal lines, in this case the signal line 200. As shown, the circuit 244 comprises a NAND gate 246 having both inputs connected to the signal line 200. The output of the NAND gate 246 is connected through a pulse shaping circuit 248 to one input of a Schmitt trigger type NAND gate 250, having its other input connected to the signal line 200. The pulse shaping circuit 248 includes a series resistor 252 and a shunt capacitor 254. The first NAND gate 246 acts as a phase inverter.

The output of the Schmitt trigger type NAND gate 250 is connected to both inputs of another NAND gate 256 which acts as a phase inverter. The output of the gate 256 delivers a narrow positive output pulse for each 0–1 state change in the signal on the signal line 200.

The function of the phase comparator 44 is to produce two pulse-width variable output signals U and D, standing for up and down. The U pulse is employed to increase the speed of the motor 12, while the D pulse is employed to decrease the speed. Both U and D are negative pulses which can vary in width from 0 to ½ cycle of the signal on the line 198. If the signals on the lines 198 and 200 are exactly in phase, there is no pulse U or D, and both outputs remain in the high state. If the signal on the line 200 lags the signal on the line 198 by 0 to ½ of a cycle, a D output pulse is produced which has a width corresponding to the amount of such lag. Conversely, if the signal on the line 200 leads the signal on the line 198, a variable-width output pulse U is produced having a width corresponding to the amount of such lead. It should be noted that when an output pulse U is produced there is no output pulse D, and vice versa.

The illustrated phase comparator circuit 44 utilizes a multiplicity of NAND gates arranged in a trigger circuit. The signal line 198 is connected to both inputs of a NAND gate 260, which acts as a phase inverter. The output of the gate 260 is connected to one input of a NAND gate 262, one input of another NAND gate 264, and one input of a multiple NAND gate 266, utilized as an output device. The gate 264 has feedback cross-connections with a NAND gate 268. Thus, the output of the gate 268 is connected to the other input of the gate 264. The output of the gate 264 is connected to one input of the gate 268, and also to a second input of the multiple NAND gate 266.

The output of the gate 262 is connected to the second input of the gate 268, and also to one input of a NAND gate 270, having its output connected to the third input of the multiple NAND gate 266. The gate 270 has feedback cross-connections with another NAND gate 272. Thus, the output of the gate 272 is connected to the second input of the gate 270, while the output of the gate 270 is connected to one input of the gate 272.

In the other input channel to the phase comparator 44, the output of the gate 256 is connected to the second input of the gate 262, and also to one input of a NAND gate 274. The other input of the gate 274 is connected to the signal line 198. The output of the gate 274 is connected to the second input of the gate 272, and also to one input of a gate 276, having feed-back cross-connections with still another NAND gate 278. Thus, the output of the gate 278 is connected to the second input of the gate 276, while the output of the gate 276 is connected to one input of the gate 278. The other input of the gate 278 is connected to the signal line 198.

The output of the multiple NAND gate 266 is amplified to provide the variable-width output pulse U, while the output of the gate 276 is amplified to provide the variable-width output pulse D.

Thus, two amplifiers 280 and 282 are connected in cascade between the output of the gate 266 and an output line or terminal 284. Another amplifier 286 is connected in parallel with the amplifier 282. Similarly, two amplifiers 288 and 290 are connected in parallel between the output of the gate 276 and an output line 292 which supplies the D pulse. The output line 284 supplies the U pulse.

FIG. 4 illustrates three examples to show the production of the comparator output signals U and D. In each case, the waveforms of the signals on the lines 198 and 200 are shown. These signals may be the phase variable signal PV and the reference frequency signal R, or vice versa. The phase of the signal on the line 200 differs from the phase of the signal on the line 198. The narrow pulses from the output of the gate 256 are also shown, along with the inverted pulses of similar waveform from the output of the gate 274. This combination of input signals produces output pulses D of a width corresponding to the difference in phase. Each output pulse D is initiated by one of the narrow pulses from the gate 256, and is terminated by the next negative going edge of the pulses from the line 198.

Example 2 is similar to example 1, except that the phase of the signal on the line 200 has been advanced to the right. This reduces the width of the output pulses D.

In example 3, the phase of the pulses on the line 200 has been advanced by an additional amount to the right. As a result, output pulses U are produced, while the D pulses are dormant. The D output is continuously at 1, or its high state. Each of the output pulses U is initiated by a negative going edge of the pulses on the line 198, and is terminated by the beginning of one of the narrow pulses from the gate 256.

If the signals on the lines 198 and 200 are exactly in phase, both output signals D and U are dormant in the high state.

Further processing the output signals U and D is carried out by the circuits illustrated in FIG. 2e, in order to control the speed of the motor 12. The U and D signal lines 284 and 292 are shown in FIG. 2e, as well as in FIG. 2d. The signals U and D are combined by a circuit 300 to generate an up-down pulse-width variable signal DE on an output terminal 302. As shown, circuit 300 comprises a transistor 304 connected between the U signal line 284 and the output terminal 302, and two transistors 306 and 308 connected in cascade between the D signal line 292 and the output terminal 302. If the output signal U is active, the combined signal DE is positive 2.5 volt pulse of variable width. If the output signal D is active, the combined signal DE is a negative 2.5 volt pulse of variable width. When the signals on the lines 198 and 200 are exactly in phase, both D and U are dormant in the high state, and the combined signal DE is 0.

FIG. 2e shows the details of the circuit 300. The U terminal 284 is connected to the base of the transistor 304 by a resistor 310 in parallel with a capacitor 312. The emitter of the transistor 304 is connected to the +5 volt terminal, while the collector is connected through a resistor 314 to the output terminal 302. A resistor 316 is connected between the +5 volt terminal and the base of the transistor 304. As shown, a Schottky diode 318 is connected between the base and the collector of the transistor 304, to increase the switching speed.

The components associated with the transistor 306 are arranged in the same manner as the components associated with the transistor 304, and thus will be designated 310a, 312a, 314a, 316a and 318a, so that the foregoing description will be applicable. However, the resistor 314a is connected to the base of the transistor 308, which has its collector connected to the output terminal 302 through a resistor 320. The emitter of the transistor 308 is connected to the −5 volt terminal. A resistor 322 is connected between the base and the emitter of the transistor 308. The transistor 308 acts as a phase inverter, so that the D signals produce negative pulses at the terminal 302, while the U signals produce positive pulses.

When there is a phase error between the reference frequency signal R and the phase variable signal PV, the combined output signal DE contains a direct current component which is directly proportional to such phase error. The direct current component will change in accordance with any change in such phase error. In addition to such direct current component, the combined output signal DE generally contains components at 52.5 kilohertz or higher, derived from the reference frequency signal R and the phase variable signal PV. It will be recalled that these signals have a frequency of 52.5 kilohertz or greater. In general, the combined output signal DE also contains all higher integral multiple harmonics of the signals at 52.5 kilohertz or greater.

In the illustrative circuit of FIG. 2e, a filter 330 is preferably employed to reject the high frequency components, so as to separate or recover the direct current error signal contained in the combined signal DE. As shown, the filter 330 takes the form of a third-order low-pass active filter, utilizing an operational amplifier 332. As shown, three filtering resistors 334, 336 and 338 are connected in series between the output terminal 302 and one input of the operational amplifier 332. A filtering capacitor 340 is connected between ground and the junction of the resistors 334 and 336. A second filtering capacitor is connected between the first input of the amplifier 332 and ground. A feedback lead 344 is connected between the output and the other input of the amplifier 332. In addition, a feedback capacitor 346 is connected between the output and the junction between the resistors 336 and 338.

The illustrated filter 330 has unity gain within its pass band and is calibrated to have its three decibel attenuation point at approximately 5 kilohertz. Thus, the filter effectively rejects the components at 52.5 kilohertz and higher frequencies, while having a relatively wide pass band at low frequencies to provide for a wide range of encoder RPM. In addition to having a wide pass band, the filter has a minimum of phase shift in the pass band of the control system. The high encoder modulation frequency of 52.5 kilohertz or greater permits a large frequency separation between the modulation frequency and the highest encoder position error frequency.

The error signal at the output of the filter amplifier 332 will be designated E. This error signal E is supplied to the motor control circuit 46, the details of which are show in FIG. 2e. In this embodiment, the motor control circuit 46 utilizes a power amplifier 350 of the operational type having one input coupled to the output of the filter amplifier 332 by a compensating circuit 352 comprising a resistor 354 in parallel with the series combination of another resistor 356 and a capacitor 358. The circuit 352 may be modified as desired to improve the stability of the motor control. A resistor 360 is connected between ground and the other input of the amplifier 350.

The motor 12 is included in a series circuit between the output of the amplifier 350 and ground. Such series circuit comprises an inductance oil 362 shunted by a resistor 364, the motor 12, and two resistors 366 and 368 in parallel. A capacitor 370 is shunted across the motor 12. A feedback resistor 372 is connected between the first input of the amplifier 350 and the junction between the motor 12 and the resistors 366 and 368. Thus, the motor 12 is included in the feedback loop of the amplifier 350. A small filter capacitor 374 is connected between the high side of the motor 12 and ground. Power supply filtering capacitors 376 and 378 are also connected to the amplifier 350.

Assuming that the direct current error signal E is recovered perfectly from the signal DE without significant phase shift, the error signal E from the output of the amplifier 332 can be shown to be:

$$E = 5{,}000\ (\theta R - \theta E)/2\pi\ 2.5\ \text{volts}$$

In this expression, $\theta_E$ is the encoder shaft angle in radians; $5{,}000\ \theta_E$ is the phase angle within one encoder disc pattern cycle. $5{,}000\ \theta_R$ is the phase angle associated with the command or reference signal R; and $5{,}000\ (\theta_R - \theta_E)/2\pi$ represents the fraction of an R cycle equivalent to the width of the DE pulse.

The error signal E from the output of the filter amplifier 332 serves as the input to the control loop compensation circuit 352 and the power amplifier 350. The motor 12 is connected in the feedback loop of the power amplifier in a manner providing nearly constant current drive to the motor. To a good approximation, one can assume that the motor current is equal to the voltage $V_4$ at the amplifier output divided by the effective resistance $R_4$. The motor current I is related to E by:

$$\frac{I}{E} = \frac{1}{R_4}\left[\frac{R_F}{R_1} + \frac{R_F}{R_2 + \frac{1}{CS}}\right]$$
$$= \frac{1}{R_4}\left[\frac{R_F}{R_1} + R_F C S\right]$$

In these expressions, $R_F/R_1$ is the proportional gain factor, and $R_F C$ is approximately the derivative path gain factor.

For the low range of RPM settings as previously mentioned, from 0 to 9.999 RPM, the back emf of the motor is not normally a significant factor. For example, a motor has been used in actual practice having a generator constant of 5.45 volts/KRPM; so that for the maximum speed of 10 RPM, this motor generates only 54.5 millivolts. Also, the use of the constant current drive tends to eliminate the influence of motor inductance.

Summarizing the various transfer functions given above yields the relationship:

$$T_M = 5{,}000\ \frac{(\theta_R - \theta_E)}{2\Pi}\ \frac{1}{R_4}\left(\frac{R_F}{R_1} + R_F C S\right) K_T V$$

where $T_M$ is the torque generated by the motor, $K_T$ is the torque constant in torque units per ampere, and V is the peak pulse voltage appearing at the output terminal 302 in FIG. 2e.

FIG. 5 shows motor control circuits which are the same as illustrated in FIG. 2e, except that the compensating circuit 352 is replaced with a more elaborate, adjustable compensating circuit 382 which makes it possible to compensate for various conditions in the motor speed control loop. It will be seen that the adjustable compensating circuit 382 comprises three signal paths connected in parallel between the output of the low pass filter amplifier 332 and the input of the power amplifier 350. Thus, the adjustable compensating circuit 382 provides a proportional control path 384, a derivative or rate control path 386, and an integral control path 388. The three control paths 384, 386 and 388 utilize operational amplifiers 390, 392 and 394.

In the embodiment of FIG. 5, the output of the filter amplifier 332 is connected through a resistor 396 to one input of the operational amplifier 390 in the proportional control path 384. The output of the amplifier 390 is connected to potentiometer 398 having its slider connected to the input of the power amplifier 350 through a resistor 400. The other input of the operational amplifier 390 is connected to ground through a resistor 402 in parallel with a capacitor 404. A feedback resistor 406 is connected between the output of the amplifier 390 and the first input.

In the derivative control path 386, a resistor 408 and a capacitor 410 are connected in series between the output of the filter amplifier 332 and one input of the operational amplifier 392. A resistor 412 is connected between this input and ground. Another resistor 414 is connected between the other input and ground. The output of the amplifier 392 is connected to a potentiometer 416 having its slider connected through a resistor 418 to the input of the power amplifier 350. A feedback resistor 420 is connected in parallel with a feedback capacitor 422 between the output of the operational amplifier 392 and the first input.

In the integral control path 388, a resistor 424 is connected between the output of the filter amplfier 332 and one input of the operational amplifier 394. A resistor 426 is connected between the other input and ground. Here again, the output of the amplifier 394 is connected to a potentiometer 428 having its slider connected to the input of the power amplifier 350 through a resistor 430. To achieve an integrating action, a feedback capacitor 432 is connected between the output and the first input of the operational amplifier 394.

By adjusting the potentiometers 398, 416 and 428, it is possible to obtain a proportional response characteristic, a derivative response characteristic, an integrating response characteristic, or any desired combination of these characteristics. In this way, it is possible to compensate for variations in the inertia and other characteristics of the load driven by the motor 12. Moreover, compensation may be achieved for other conditions in the motor speed control loop. The variable compensating system 382 makes it possible to provide stable operation of the speed control system under varying conditions. Thus, the embodiment of FIG. 5 is generally preferred over the embodiment of FIG. 2e. The proportional derivative and integral adjustments provide means for optimizing the control system, for more universal usage.

FIG. 6 illustrates a master-slave control system, utilizing a master encoder 440 and a slave encoder 442 having phase variable outputs $PV_M$ and $PV_S$ connected to the two inputs of the phase comparator or detector 44, which may be the same as described in connection with FIGS. 1 and 2. The phase variable output $PV_M$ from the master encoder 440 is employed instead of the reference frequency signal R, employed in the system of FIGS. 1 and 2.

In the master-slave system of FIG. 6, the slave encoder 442 follows the movement of the master encoder 440. The slave encoder 442 may be arranged in the same manner as described in connection with FIGS. 1 and 2. Both the master encoder 440 and the slave encoder 442 derive their modulation frequency or time base from the circuits comprising the stable oscillator 20, the frequency dividers 22 and the quadrature output circuit 24, all of which may be arranged the same as described in connection with FIGS. 1 and 2. The modulation frequency signals may be at 52.5 kilohertz, or any other suitable frequency.

The slave encoder 442 may include the encoder choppers or modulators 26, encoder photocells 18, the amplifier 28, the chopper spike rejection circuit 30, the low pass filter 32 and the zero crossing detector 34, all of which may be the same as described in connection with FIGS. 1 and 2. The circuits of FIGS. 2a, 2b and 2d are fully applicable to the master-slave system of FIG. 6.

The master encoder 440 of FIG. 6 includes another complete set of encoder components, which may be the same as the encoder choppers 26, the encoder photocells 18, the amplifier 28, the chopper spike rejection circuit 30, the low pass filter 32 and the zero crossing detector 34, as described in connection with FIGS. 1 and 2. The detailed circuits may be the same as illustrated in FIG. 2b.

Instead of utilizing the motor control circuits of FIG. 2e, the master-slave embodiment of FIG. 6 utilizes a modified motor control circuit 444, receiving its input signals from the U and D output lines 284 and 292 of the phase comparator 44. Thus, the pulses U and D are applied directly to motor control circuit 444. The U and D output lines 284 and 292 are shown in FIG. 2d, and also in FIG. 6.

The motor control circuit 444 of FIG. 6 utilizes duplicate transistor circuits for the U and D pulses, but with their outputs oppositely polarized, so that the U pulses will cause the motor 12 to rotate in one direction, while the D pulses will cause the motor to operate in the opposite direction. Corresponding components of the U and D transistor circuits have been given the same reference characters in FIG. 6, with the addition of the suffixes U and D, so that the following description of the U transistor circuits will also be applicable to the D transistor circuits.

Thus, the U output line 284 of the phase comparator 44 is connected through a resistor 446U to the base of a transistor 448U. Another resistor 450U is connected from the base to a +20 volt terminal. A load resistor 452U is connected between the emitter of the transistor 448U and the +20 volt terminal. The resistors 454U and 456U are connected between the collector of the transistor 448U and ground.

The base of a second transistor 458U is connected to the junction between the resistors 454U and 456U. The emitter of the transistor 458U is connected to ground, while the collector is connected to one side of a motor circuit 460, comprising the motor 12, a resistor 462 in series with the motor, and the series combination of a resistor 464 and a capacitor 466, connected in parallel with the series combination of the motor 12 and the resistor 462.

The other side of the motor circuit 460 is connected to the collector of a third transistor 468U, having its base connected to the emitter of the transistor 448U. The emitter of the transistor 468U is connected through a resistor 470U to the +20 volt terminal.

Currents are developed in the transistors 448U, 458U and 468U in response to the U pulses. The current through the transistors 458U and 468U flows through the motor 12 and causes it to operate in one direction. On the other hand, the D pulses produce a motor current in the opposite direction, so that the motor is causes to rotate in the opposite direction. The collectors of the transistors 458D and 468D are connected to the opposite sides of the motor circuit 460, with a polarity which is reversed relative to the polarity of the connections between the motor circuit and the transistors 458U and 468U.

In the master-slave system of FIG. 6, both the master encoder 440 and the slave encoder 442 receive the same input signals X, $\overline{X}$, Y and $\overline{Y}$, which contain sine and cosine components, sin wt and cos wt. The master encoder 440 and the slave encoder 442 produce separate phase variable output signals $PV_M$ and $PV_S$, corresponding to sine $(wt + \theta_M)$ and sin $(wt + \theta_S)$. When the encoders are not rotating, these phase variable signals have exactly equal frequencies.

The phase variable signals are applied to the inputs of the phase comparison circuit 44. The output pulses U and D from the phase comparator 44 cause the motor 12 to rotate in opposite directions. The motor 12 is mechanically connected to the slave encoder disc or other member. When the master encoder disc is rotated by some independent means, such as an independent motor drive, the slave encoder follows the master encoder as to both speed and phase. The master-slave control system operates down to 0 speed and in a continuously variable, nondiscrete manner.

The master-slave system of FIG. 6 can be used as an electronic gearing system by utilizing master and slave encoders of different resolutions.

In the motor control circuit 444 of FIG. 6, the motor current is switched. This motor control circuit has a variety of applications and is not restricted to a system having a master-slave mode of operation. Thus, the motor control circuit 444 of FIG. 6 may be used in conjunction with larger motors, in lieu of the direct current power amplifier circuit 46 shown in FIGS. 2e and 5, and conversely.

In the speed control system of FIGS. 1 and 2, the reference frequency generator may be regarded as a synthetic master for controlling the speed and phase of the motor driven encoder. Other modified synthetic masters may be employed if desired. For example, the reference frequency generator may be replaced with a simple variable frequency oscillator. However, such an oscillator generally has a low order of stability, so that precise control over the speed and phase of the motor driven encoder is difficult to achieve. Instead of utilizing the rate multiplier system of FIG. 2c, the reference frequency signal can be generated by using low frequency quadrature signals to modulate a signal at the encoder input frequency, such as 52.5 kilohertz. The low frequency quadrature signals can be produced by utilizing logic gates and a counter string driven by a variable frequency oscillator operating in a low frequency range. The low frequency quadrature signals may be combined with a signal at the encoder input frequency in a manner similar to the modulation system employed in the encoder. In this way, a synthetic phase variable master signal can be developed. This signal is used in the same manner as the reference frequency signal of FIGS. 1 and 2.

Figure 7:
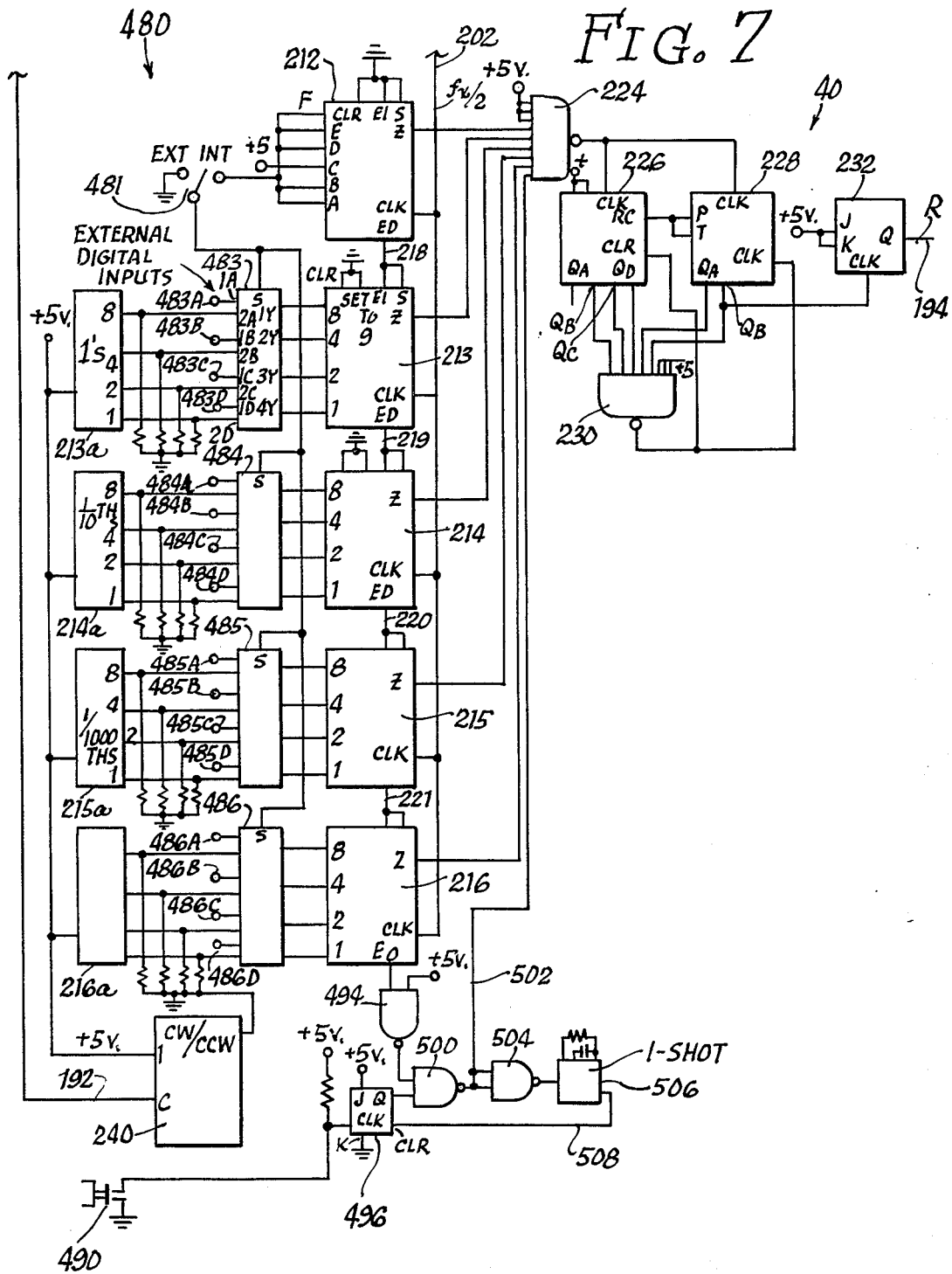
FIG. 7 is a schematic diagram of a modified reference frequency generating circuit which provides external digital control over the reference frequency.

FIG. 7 illustrates a modified system 480, similar to the system 38 illustrated in FIG. 2c, for generating for reference frequency signal, but with a provision for direct external digital control over the reference frequency. The external digital control signals may be derived from a computer or some external control system. The computer may be programmed to generate various velocity profiles. For example, a uniformly stepped digital input word can be used to approximate a low value, constant acceleration.

The system 480 of FIG. 7 provides for both external digital control, and internal control by the switches 213a, 214a, 215a and 216a. The changeover between internal and external control can be brought about by operating a suitable selector device, illustrated as a selector switch 481, which controls a set of data selector integrated circuits 483, 484, 485 and 486, interposed between the switches 213a–216a and the rate multipliers 213–216. The data selectors 483–486 act as multi-pole, double throw switches. As shown, each of the data selectors 483–486 has four output terminals 1Y, 2Y, 3Y and 4Y, connected to the four input terminals of the corresponding rate multipliers 213–216. In addition, each of the data selectors 483-486 has first and second sets of input terminals 1A, 2A, 1B, 2B, 1C, 2C, 1D, and 2D. Each of the control switches 213a–216a is connected to the second set of input terminals 2A, 2B, 2C, and 2D of the corresponding data selector.

As to each of the data selectors 483–486, the input terminals 1A, 1B, 1C and 1D are brought out to external digital input terminals. In the case of the data selector 483, these external digital input terminals are designated 483A–D. Similarly, the external digital input terminals for the other data selectors 484, 485 and 486 are designated 484A–D, and 485A–D, and 486A–D. The external digital input terminals may be connected to a computer, or to an external control system, to provide digital input words for the rate multipliers 213–216.

When the selector switch 481 is in its external position, the select terminals S of the data selectors 483–486 are connected to ground, so that the external digital input terminals are selected. When the switch 481 is in its internal position, the S terminals are connected to the +5 volt terminal, so that the internal control switches 213a–216a are selected.

The system 480 of FIG. 7 also provides for a stepped manual input, whereby the 0 position of phase difference between the phase variable signal PV and the reference frequency signal R can be changed in small steps, by manually manipulating a suitable control, such as the illustrated push button switch 490. Closure of the switch 490 actuates a stepping circuit 492 which adds one or more pulses to the reference frequency signal R. In this case, the stepping circuit 492 adds a single pulse in one of the blank spaces in the pulse train, following the closure of the push button switch 490.

The pulses to be added by the circuit 492 are derived from the output terminal $E_O$ of the rate multiplier 216. In this case, such output terminal is connected to one input of a NAND gate 494 having its other input connected to the +5 volt terminal.

In the embodiment of FIG. 7, one side of the push button switch 490 is connected to ground, and the other side is connected to the clock input of a J-K master-slave flip-flop 496. A resistor 498 is also connected between the clock input and the +5 volt terminal. The Q output of the flip-flop 496 is connected to one input of a NAND GATE 500 having its other input connected to the output of the gate 494. When the push button switch 490 is closed, the flip-flop 496 is triggered so that the first input of the gate 500 goes to a high state. Thus, the gate 500 is conditioned to pass the next pulse from the gate 494. Such pulse is derived from the output of the rate multiplier 216, which produces brief output pulses at a low repetition rate.

The pulse which passes through the gate 500 is transmitted to one of the inputs of the multiple input NAND gate 224 by a line 502. It will be recalled that the gate 224 acts as a pulse summing device. Thus, the single pulse transmitted to the gate 224 by the line 502 is added to the output pulse train in a blank space in such pulse train.

The output pulse from the gate 500 is also employed to reset the flip-flop 496 so as to close the gate 500. To accomplish this resetting operation, both inputs of a NAND gate 504 are connected to the output of the gate 500. The gate 504 is employed as a phase inverter. The output of the gate 504 is connected to a one-shot flip-flop 506 which delivers its output pulse to a line 508 extending back to the clear input of the flip-flop 496. Thus, the pulse from the one-shot 506 clears the flip-flop 496 so that its Q output goes to 0. This closes the gate 500.

The addition of the pulse by the operation of the push button 490 causes a small change in the 0 position of the phase difference between the phase variable signal and the reference frequency signal. Thus, the 0 position can be adjusted by setting all of the switches 213a –216a to 0, whereupon the push button 409 can be operated to adjust the 0 position. By introducing a counter into the reset circuit, the pulse addition circuit can be arranged to deliver more than one pulse after the push button 490 is closed.

The speed control system of FIGS. 1 and 2 has the important advantage of being capable of continuous control for rates arbitrarily close to 0 RPM, that is, with no appreciable stepping action. Prior systems which were capable of operation at or near 0 speed has the disadvantage that the motion of the encoder proceeded in jumps.

Moreover, the speed control system of the present invention is capable of achieving greater instantaneous accuracy than prior systems. The system of the present invention can have the accuracy inherent in the precise position information of a high-resolution encoder, but without the quantizing error of a digital encoder. For example, a 20-bit digital encoder might have information edge placement error of perhaps 0.7 arc seconds, and a quantizing error of 1.23 arc seconds. Under comparable conditions as to the code disc, the bearings, the dual readout stations and other factors, the control system of the present invention has comparable positional sensing capability and thus can be accurate to about 0.7 arc seconds. The precision or repeatability of the positional sensing can be less than such 0.7 arc second figure and is limited only by uncertainty introduced by noise. These statements should not be construed to mean that the encoder shaft position can be held to an error of 0.7 arc seconds for all shaft loads. The error factor depends upon the particular motor characteristics, the system gain, and the nature of the perturbing influence of the external encoder-motor shaft loading.

Those skilled in the art will understand that the types and values of components are subject to wide variations to suit varying conditions and needs. However, suggested values and types set forth in the following tables may be of assistance to those skilled in the art in carrying out the present invention.

| Transistors & Integrated Circuits | Type Numbers | Transistors & Integrated Circuits | Type Numbers |
|---|---|---|---|
| 50 | SN 74S00 | 308 | 2N918 |
| 52 | SN 74S00 | 332 | LH2208 |
| 64 | SN 74S00 | 350 | HC 2000 |
| 68 | SN 74163 | 390 | LH 2208 |
| 70 | SN 7473 | 392 | LH 2208 |
| 72 | SN 7473 | 394 | LH 2208 |
| 74 | SN 7473 | 448D, 448U | 2N 4918 |
| 76 | SN 7473 | 458D, 458U | MJE 3055 |
| 78 | SN 7473 | 468D, 468U | 2N 3792 |
| 80 | SN 74157 | 483–486 | 74157 |
| 82 | SN 7400 | 494 | SN 74S00 |
| 84 | SN 7400 | 496 | SN 7473 |
| 88a–d | MPS918 (2N918) | 500 | SN 74200 |
| 92' | MC 1530 | 504 | SN 7400 |
| 114 | CM 641 | 506 | SN74121 |
| 116 | 2N 3823 | | |
| 120 | 2N 2907 | | |
| 122 | 2N 918 | | |
| 150 | MC 1530 | | |
| 174 | LM 311 | | |
| 196 | SN 74157 | | |
| 212 | SN 7497 | | |
| 213–216 | SN74167 | | |
| 224 | SN7430 | | |
| 226 | SN74163 | | |
| 228 | SN74163 | | |
| 230 | SN7430 | | |
| 232 | SN7473 | | |
| 246 | SN7400 | | |
| 250 | SN7413 | | |
| 256 | SN7400 | | |
| 260 | SN 7400 | | |
| 262 | SN 7400 | | |
| 264 | SN 7400 | | |
| 266 | SN7420 | | |
| 268 | SN 7400 | | |
| 270 | SN 7400N | | |
| 272 | SN 7400N | | |
| 274 | SN7400 | | |
| 276 | SN 7400N | | |
| 278 | SN 7400N | | |
| 280 | SN 7406N | | |
| 282 | SN 7406N | | |
| 286 | SN 7406N | | |
| 288 | SN 7406N | | |
| 290 | SN 7406N | | |
| 304 | 2N 3908 | | |
| 306 | 2N 3908 | | |

| Resistors | Ohms | Resistors | Ohms |
|---|---|---|---|
| 56 | 1 K | 408 | 2.2 K |
| 92a–d | 10 K | 412 | 10 K |
| 94a–d | 47 K | 414 | 10 K |
| 98a–d | | 416 | 1 K |
| 100a–d | 1 K | 418 | 5.1 K |
| 104a–d | 1 K | 420 | 100 K |
| 94' | 10 K | 424 | 100 K |
| 96' | 10 K | 426 | 100 K |
| 100' | 1 K | 428 | 1 K |
| 102' | 33 | 430 | 5.1 K |
| 110 | 10 K | 446D, U | 120 |
| 124 | 4.7 K | 450D, U | 82 |
| 126 | 1.5 K | 452D, U | 10 |
| 130 | 4.7 K | 454D, U | 82 |
| 134 | 1 K | 456D, U | 22 |
| 136 | 2 K | 462 | 2 |
| 140 | 10 K | 464 | 10 |
| 142 | 470 | 470D, U | 1 |
| 146 | 5.6 K | 498 | 1 K |
| 154 | 2.7 K | | |
| 156 | 2.7 K | | |
| 158 | 2.7 K | | |
| 160 | 10 K | | |
| 168 | 33 | | |
| 178 | 2 K | | |
| 180 | 1.8 K | | |
| 182 | 200 | | |
| 184 | 47 K | | |
| 186 | 2 K | | |
| 252 | 300 | | |
| 310, 310a | 3 K | | |
| 314, 314a | 510 | | |
| 316, 316a | 2.2 K | | |
| 320 | 510 | | |
| 322 | 2.2 K | | |
| 334 | 10 K | | |
| 336 | 10 K | | |
| 338 | 10 K | | |
| 354 | 5.1 K | | |
| 356 | | | |
| 360 | 4.7 K | | |
| 364 | 22 | | |
| 366 | 1 | | |
| 368 | 1 | | |
| 372 | 5.1 K | | |
| 396 | 10 K | | |
| 398 | 1 K | | |
| 400 | 5.1 K | | |
| 402 | 10 K | | |

-continued

| | | | |
|---|---|---|---|
| 406 | 100 K | | |

| Capacitors | Microfarads (µf) Picofarads (pf) | Inductors | Microhenrys |
|---|---|---|---|
| 54 | .004 µf | 60 | 1 |
| 62 | 100 pf | 362 | 8 |
| 96a–d | .01 µf | | |
| 102a–d | 150 pf | | |
| 98' | .01 µf | | |
| 104' | 22 µf | | |
| 106 | 22 µf | | |
| 108 | 10 pf | | |
| 112 | 1800 pf | | |
| 132 | 150 pf | | |
| 144 | 2200 pf | | |
| 152 | 2200 pf | | |
| 162 | 1570 pf | | |
| 164 | 220 pf | | |
| 166 | 3900 pf | | |
| 170 | 22 µf | | |
| 176 | .01 µf | | |
| 254 | 1500 pf | | |
| 312, 312a | 150 pf | | |
| 340 | 4360 pf | | |
| 342 | 635 | | |
| 346 | 11100 | | |
| 358 | .18 µf | | |
| 370 | .05 µf | | |
| 374 | .05 µf | | |
| 376 | 22 µf | | |
| 378 | 22 µf | | |
| 404 | .1 µf | | |
| 410 | .1 µf | | |
| 422 | 220 pf | | |
| 432 | .1 µf | | |
| 466 | 10 µf | | |

I claim:
1. A speed control system,
comprising a modulation signal source for producing a modulation frequency signal,
an encoder having a movable member adapted to be connected to a device whose speed is to be controlled,
means for supplying said modulation frequency signal to said encoder,
said encoder including means for converting said modulation frequency signal into a phase variable signal having a phase which is varied as a function of the position of the movable member of said encoder,
variable reference frequency control means connected to said modulation signal source for producing a variable reference frequency signal which may differ in frequency or phase from said modulation frequency signal by a selectable differential,
and means for comparing said phase variable signal with said variable reference frequency signal and for producing a speed control signal as a function of any phase differential between said phase variable signal and said variable reference frequency signal,
said modulation signal source including a generator for producing a high frequency signal,
and frequency dividing means for dividing the frequency of said high frequency signal to produce said modulation frequency signal,
said variable reference frequency control means includes means for deriving a train of input pulses from said generator,
means for removing certain of the pulses from said train,
reinserting means for selectively reinserting certain of said removed pulses to produce a variable frequency pulse train,
and means for dividing the frequency of said variable frequency pulse train to produce said variable reference frequency signal.

2. A speed control system according to claim 1, in which said reinserting means includes a plurality of selectively operable digital controls for selecting the number of pulses to be reinserted.

3. A speed control system according to claim 1, in which said reinserting means includes a plurality of digital input terminals for external control over the number of pulses to be reinserted.

4. A speed control system according to claim 1, in which said reinserting means includes selectively operable stepping means for selectively reinserting at least one isolated pulse to step the phase of said reference frequency signal.

5. A speed control system according to claim 4, in which said stepping means includes a manually operable push button control.

6. A speed control system,
comprising a modulation signal source for producing a modulation frequency signal,
an encoder having a movable member adapted to be connected to a device whose speed is to be controlled,
means for supplying said modulation frequency signal to said encoder,
said encoder including means for converting said modulation frequency signal into a phase variable signal having a phase which is varied as a function of the position of the movable member of said encoder,
variable reference frequency control means connected to said modulation signal source for producing a variable reference frequency signal which may differ in frequency or phase from said modulation frequency signal by a selectable differential,
and means for comparing said phase variable signal with said variable reference frequency signal and for producing a speed control signal as a function of any phase differential between said phase variable signal and said variable reference frequency signal,
said variable frequency control means including means for deriving a train of input pulses from said modulation signal source,
and means including a plurality of rate multipliers for removing certain of the pulses from said pulse train and for selectively reinserting certain of the removed pulses to produce a variable frequency pulse train,
and means for converting said variable frequency pulse train into said variable reference frequency signal.

7. A speed control system according to claim 6, including a plurality of selectively operable digital controls connected to said rate multipliers for selecting the number of pulses to be reinserted.

8. A speed control system according to claim 7, including a plurality of digital input terminals for external control over the number of pulses to be reinserted,
and means for selecting between said digital controls and said digital input terminals.

9. A control system,
comprising a modulation signal source for supplying a modulation frequency signal, an encoder having a movable member adapted to be connected to a device whose movement is to be controlled, means for supplying said modulation frequency signal to said encoder, said encoder including means for converting said modulation frequency signal into a phase variable signal having a phase which is varied as a function of the position of the movable member of said encoder, a variable frequency command signal source for supplying a command signal, and phase comparator means for comparing said phase variable signal with said command signal and for producing a control signal as a function of any phase differential between said phase variable signal and said command signal, said command signal source including a second encoder to serve as a master encoder for controlling the first mentioned encoder as a slave encoder, said master encoder having means for connecting said master encoder to said modulation signal source for supplying said modulation frequency signal to said master encoder, said master encoder having a movable control member, said master encoder including means for converting the modulation frequency signal supplied thereto into a master phase variable signal having a phase which is varied as a function of the position of the movable control member of said master encoder, said phase comparator means producing a control signal as a function of any phase differential between said phase variable signal of said slave encoder and said phase variable signal of said master encoder.

10. A control system according to claim 9, including a motor connected to said slave encoder, and motor control means for utilizing said control signal to operate said motor in a direction to eliminate said phase differential.

11. A control system according to claim 10, in which said phase comparator means includes means for producing a control signal in the form of variable width pulses having a width corresponding to said phase differential.

12. A control system according to claim 10, in which said phase comparator means includes means for producing a control signal in the form of variable width pulses having a width corresponding to the magnitude of said phase differential and having a polarity when supplied to said motor corresponding to the polarity of said phase differential.

13. A speed control system, comprising a modulation signal source for producing a modulation frequency signal, an encoder having a movable member adapted to be connected to a device whose speed is to be controlled, means for supplying said modulation frequency signal to said encoder;

said encoder including means for converting said modulation frequency signal into a phase variable signal having a phase which is varied as a function of the position of the movable member of said encoder, variable reference frequency control means connected to said modulation signal source for producing a variable reference frequency signal which may differ in frequency or phase from said modulation frequency signal by a selectable differential, and means for comparing said phase variable signal with said variable reference frequency signal and for producing a speed control signal as a function of any phase differential between said phase variable signal and said variable reference frequency signal, said variable reference frequency control means including means for deriving a train of input pulses from said modulation signal source, and control means for removing certain of the pulses from said pulse train and for selectively reinserting certain of the removed pulses to produce a variable frequency pulse train, and means for converting said variable frequency pulse train into said variable reference frequency signal.

14. A speed control system according to claim 13, including a plurality of selectively operable digital controls connected to said control means for selecting the number of pulses to be reinserted.

15. A speed control system according to claim 14, including a plurality of digital input terminals for external control over the number of pulses to be reinserted, and means for selecting between said digital controls and said digital input terminals.

16. A speed control system, comprising a modulation signal source for producing a modulation frequency signal, an encoder having a movable member adapted to be connected to a device whose speed is to be controlled, means for supplying said modulation frequency signal to said encoder, said encoder including means for converting said modulation frequency signal into a phase variable signal having a phase which is varied as a function of the position of the movable member of said encoder, variable reference frequency control means connected to said modulation signal source for producing a variable reference frequency signal which may differ in frequency or phase from said modulation frequency signal by a selectable differential, and means for comparing said phase variable signal with said variable reference frequency signal and for producing a speed control signal as a function of any phase differential between said phase variable signal and said variable reference frequency signal, said last mentioned means including means for producing variable width pulses having a width corresponding to said phase differential.

17. A speed control system according to claim 16, including a motor connected to said encoder, and means for utilizing said variable width pulses to operate said motor at a speed corresponding to the pulse width.

18. A speed control system, comprising a modulation signal source for producing a modulation frequency signal, an encoder having a movable member adapted to be connected to a device whose speed is to be controlled, means for supplying said modulation frequency signal to said encoder, said encoder including means for converting said modulation frequency signal into a phase variable signal having a phase which is varied as a function of the position of the movable member of said encoder, variable reference frequency control means connected to said modulation signal source for producing a variable reference frequency signal which may differ in frequency or phase from said modulation frequency signal by a selectable differential, and means for comparing said phase variable signal with said variable reference frequency signal and for producing a speed control signal as a function of any phase differential between said phase variable signal and said variable reference frequency signal, said last mentioned means comprising means for producing variable width pulses having a width corresponding to said phase differential and having a polarity corresponding to the polarity of said phase differential.

19. A speed control system according to claim 18, including a motor, and means for utilizing said variable width pulses to operate said motor at a speed corresponding to the pulse width and in a direction corresponding to the polarity of said pulses, said motor being coupled to said encoder.

20. A control system, comprising a modulation signal source for supplying a modulation frequency signal, an encoder having a movable member adapted to be connected to a device whose movement is to be controlled, means for supplying said modulation frequency signal to said encoder, said encoder including means for converting said modulation frequency signal into a phase variable signal having a phase which is varied as a function of the position of the movable member of said encoder, a variable frequency command signal source for supplying a command signal, and phase comparator means for comparing said phase variable signal with said command signal and for producing a control signal as a function of any phase differential between said phase variable signal and said command signal, said phase comparator means including first and second output channels, and means for producing a control signal in said first output channel when said phase differential is of one polarity while producing a control signal in said second channel when said phase differential is of the opposite polarity.

21. A control system, comprising a modulation signal source for supplying a modulation frequency signal, an encoder having a movable member adapted to be connected to a device whose movement is to be controlled, means for supplying said modulation frequency signal to said encoder, said encoder including means for converting said modulation frequency signal into a phase variable signal having a phase which is varied as a function of the position of the movable member of said encoder, a variable frequency command signal source for supplying a command signal, and phase comparator means for comparing said phase variable signal with said command signal and including means for producing variable width output pulses corresponding in width to any phase differential between said phase variable signal and said command signal, said phase comparator means including first and second output channels, and means for producing said variable width output pulses in said first channel when said phase differential is of one polarity while producing said variable width output pulses in said second channel when said phase differential is of the opposite polarity.

22. A control system according to claim 21, including additional output means connected to the outputs of said first and second output channels for producing output signals of one polarity in response to said output pulses from said first channel while producing output signals of the opposite polarity in response to said output pulses from said second channel.

* * * * *